(12) United States Patent
Jia et al.

(10) Patent No.: US 12,085,815 B2
(45) Date of Patent: Sep. 10, 2024

(54) SUBSTRATE MODULE, DISPLAY APPARATUS, AND LIQUID CRYSTAL ANTENNA

(71) Applicant: Shanghai Tianma Micro-Electronics Co., Ltd., Shanghai (CN)

(72) Inventors: Zhenyu Jia, Shanghai (CN); Kerui Xi, Shanghai (CN); Ping Su, Shanghai (CN); Baiquan Lin, Shanghai (CN); Linzhi Wang, Shanghai (CN); Qingsan Zhu, Shanghai (CN); Xiaonan Han, Shanghai (CN); Yifan Xing, Shanghai (CN); Xin Li, Shanghai (CN); Feng Qin, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/880,994

(22) Filed: Aug. 4, 2022

(65) Prior Publication Data

US 2023/0393437 A1   Dec. 7, 2023

(30) Foreign Application Priority Data

Jun. 1, 2022   (CN) .......................... 202210621782.5

(51) Int. Cl.
*G02F 1/1345*   (2006.01)
*H01Q 1/38*   (2006.01)
(Continued)

(52) U.S. Cl.
CPC ............. *G02F 1/1345* (2013.01); *H01Q 1/38* (2013.01); *H01Q 3/36* (2013.01); *G06F 1/1698* (2013.01)

(58) Field of Classification Search
CPC . G02F 1/13452; G02F 1/1345; G02F 1/13458
See application file for complete search history.

(56) References Cited

U.S. PATENT DOCUMENTS

| | | | |
|---|---|---|---|
| 2012/0211772 A1* | 8/2012 | Moh | ................... H01L 27/0288 438/34 |
| 2019/0355765 A1 | 11/2019 | Li et al. | |
| 2020/0365623 A1* | 11/2020 | Chien | ................. H01L 27/1288 |

FOREIGN PATENT DOCUMENTS

| | | |
|---|---|---|
| CN | 104914606 A | 9/2015 |
| CN | 105047152 A | 11/2015 |

(Continued)

*Primary Examiner* — Alexander P Gross
(74) *Attorney, Agent, or Firm* — Anova Law Group, PLLC

(57) ABSTRACT

A substrate module, a display apparatus, and a liquid crystal antenna are provided in the present disclosure. The substrate module includes a first substrate. The first substrate includes a first sub-region and a second sub-region; the second sub-region includes a binding region; and the binding region includes first pins. The first sub-region includes first loads, and a first sub-pin is electrically connected to the first load. The second sub-region includes at least one second load, and a second sub-pin is electrically connected to the second load. The second load includes a capacitor including a first capacitor. The first substrate includes a first base substrate, a first electrode layer, a first insulating layer and a second electrode layer. Along a direction perpendicular to a plane of the base substrate, an overlapping portion of a first electrode portion and a second electrode portion forms the first capacitor.

18 Claims, 25 Drawing Sheets

(51) Int. Cl.
*H01Q 3/36* (2006.01)
*G06F 1/16* (2006.01)

(56) References Cited

FOREIGN PATENT DOCUMENTS

| | | | |
|---|---|---|---|
| CN | 108415601 A | | 8/2018 |
| CN | 110018597 A | | 7/2019 |
| CN | 110515496 A | | 11/2019 |
| CN | 111007956 A | | 4/2020 |
| CN | 111490086 A | | 8/2020 |
| CN | 115032836 A | * | 9/2022 |

* cited by examiner

SUBSTRATE MODULE, DISPLAY APPARATUS, AND LIQUID CRYSTAL ANTENNA

CROSS-REFERENCE TO RELATED APPLICATION

This application claims the priority of Chinese Patent Application No. 202210621782.5, filed on Jun. 1, 2022, the content of which is incorporated herein by reference in its entirety.

TECHNICAL FIELD

The present disclosure generally relates to the field of communication technology and, more particularly, relates to a substrate module, a display apparatus, and a liquid crystal antenna.

BACKGROUND

In the existing technology, in order to drive and control devices in a substrate through a drive chip, the pins in the drive chip need to be connected to the pins in the substrate, and such structure is widely used in various fields. When the number of pins in the drive chip is greater than the number of pins in the substrate, some pins in the drive chip may be in a floating state, thereby affecting drive chip performance.

SUMMARY

One aspect of the present disclosure provides a substrate module. The substrate module includes a first substrate. The first substrate includes a first sub-region and a second sub-region; the second sub-region is on a side of the first sub-region along a first direction; the second sub-region includes a binding region; the binding region includes a plurality of first pins arranged along a second direction; and the first direction intersects the second direction. The plurality of first pins includes at least one first sub-pin and at least one second sub-pin; the first sub-region includes a plurality of first loads, and a first sub-pin is electrically connected to a first load of the plurality of first loads; the second sub-region includes at least one second load, and a second sub-pin is electrically connected to a second load; the second load includes a capacitor including a first capacitor; the first substrate includes a first base substrate, and further includes a first electrode layer, a first insulating layer and a second electrode layer which are sequentially arranged on a side of the first base substrate; the first electrode layer includes a first electrode portion; the second electrode layer includes a second electrode portion; and the second electrode portion is electrically connected to the second sub-pin; and along a direction perpendicular to a plane of the base substrate, the first electrode portion is at least partially overlapped with the second electrode portion; and an overlapping portion of the first electrode portion and the second electrode portion forms the first capacitor.

Another aspect of the present disclosure provides a display apparatus including a substrate module. The substrate module includes a first substrate. The first substrate includes a first sub-region and a second sub-region; the second sub-region is on a side of the first sub-region along a first direction; the second sub-region includes a binding region; the binding region includes a plurality of first pins arranged along a second direction; and the first direction intersects the second direction. The plurality of first pins includes at least one first sub-pin and at least one second sub-pin; the first sub-region includes a plurality of first loads, and a first sub-pin is electrically connected to a first load of the plurality of first loads; the second sub-region includes at least one second load, and a second sub-pin is electrically connected to a second load; the second load includes a capacitor including a first capacitor; the first substrate includes a first base substrate, and further includes a first electrode layer, a first insulating layer and a second electrode layer which are sequentially arranged on a side of the first base substrate; the first electrode layer includes a first electrode portion; the second electrode layer includes a second electrode portion; and the second electrode portion is electrically connected to the second sub-pin; and along a direction perpendicular to a plane of the base substrate, the first electrode portion is at least partially overlapped with the second electrode portion; and an overlapping portion of the first electrode portion and the second electrode portion forms the first capacitor.

Another aspect of the present disclosure provides a liquid crystal antenna including a substrate module. The substrate module includes a first substrate. The first substrate includes a first sub-region and a second sub-region; the second sub-region is on a side of the first sub-region along a first direction; the second sub-region includes a binding region; the binding region includes a plurality of first pins arranged along a second direction; and the first direction intersects the second direction. The plurality of first pins includes at least one first sub-pin and at least one second sub-pin; the first sub-region includes a plurality of first loads, and a first sub-pin is electrically connected to a first load of the plurality of first loads; the second sub-region includes at least one second load, and a second sub-pin is electrically connected to a second load; the second load includes a capacitor including a first capacitor; the first substrate includes a first base substrate, and further includes a first electrode layer, a first insulating layer and a second electrode layer which are sequentially arranged on a side of the first base substrate; the first electrode layer includes a first electrode portion; the second electrode layer includes a second electrode portion; and the second electrode portion is electrically connected to the second sub-pin; and along a direction perpendicular to a plane of the base substrate, the first electrode portion is at least partially overlapped with the second electrode portion; and an overlapping portion of the first electrode portion and the second electrode portion forms the first capacitor.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
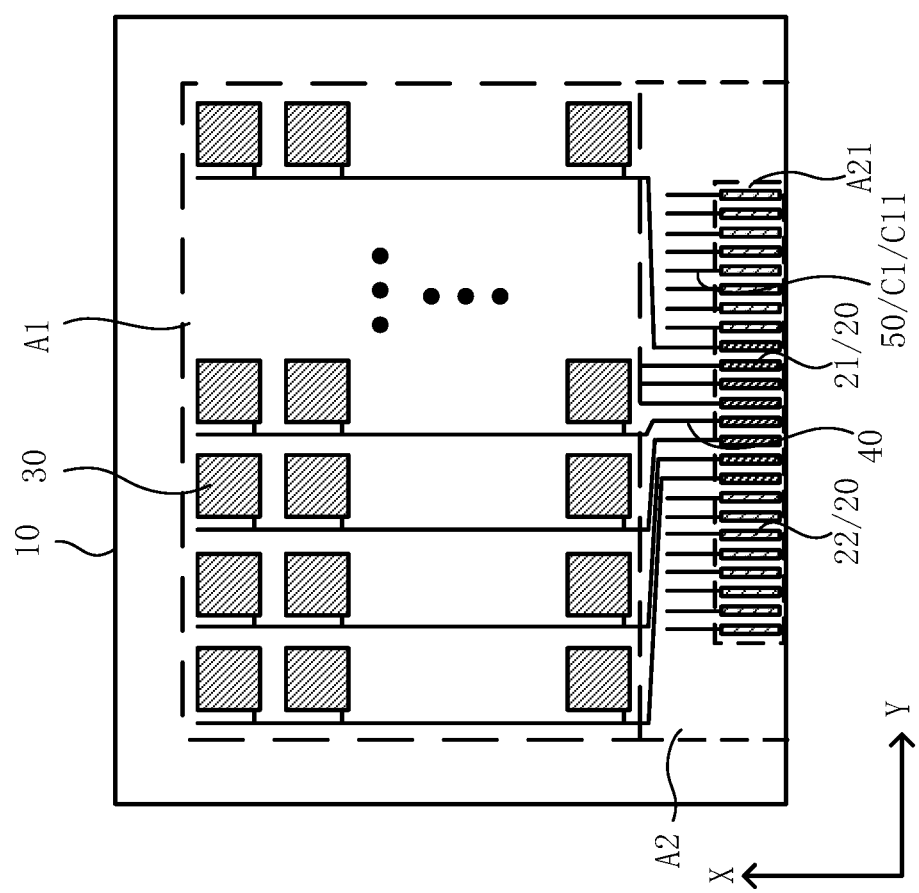
FIG. 1 illustrates a planar schematic of a substrate module according to various embodiments of the present disclosure.

Various exemplary embodiments of the present disclosure are be described in detail with reference to the accompanying drawings. It should be noted that unless specifically stated otherwise, relative arrangement of components and steps, numerical expressions and numerical values described in these embodiments may not limit the scope of the present disclosure.

The following description of at least one exemplary embodiment may be merely illustrative and may not be used to limit the present disclosure and its application or use.

The technologies, methods, and apparatuses known to those skilled in the art may not be discussed in detail, but where appropriate, the technologies, methods, and apparatuses should be regarded as a part of the present disclosure.

In all examples shown and discussed herein, any specific value should be interpreted as merely exemplary, rather than as a limitation. Therefore, other examples in exemplary embodiment may have different values.

It should be noted that similar reference numerals and letters indicate similar items in the following drawings. Therefore, once an item is defined in one drawing, it does not need to be further discussed in the subsequent drawings.

Figure 2:
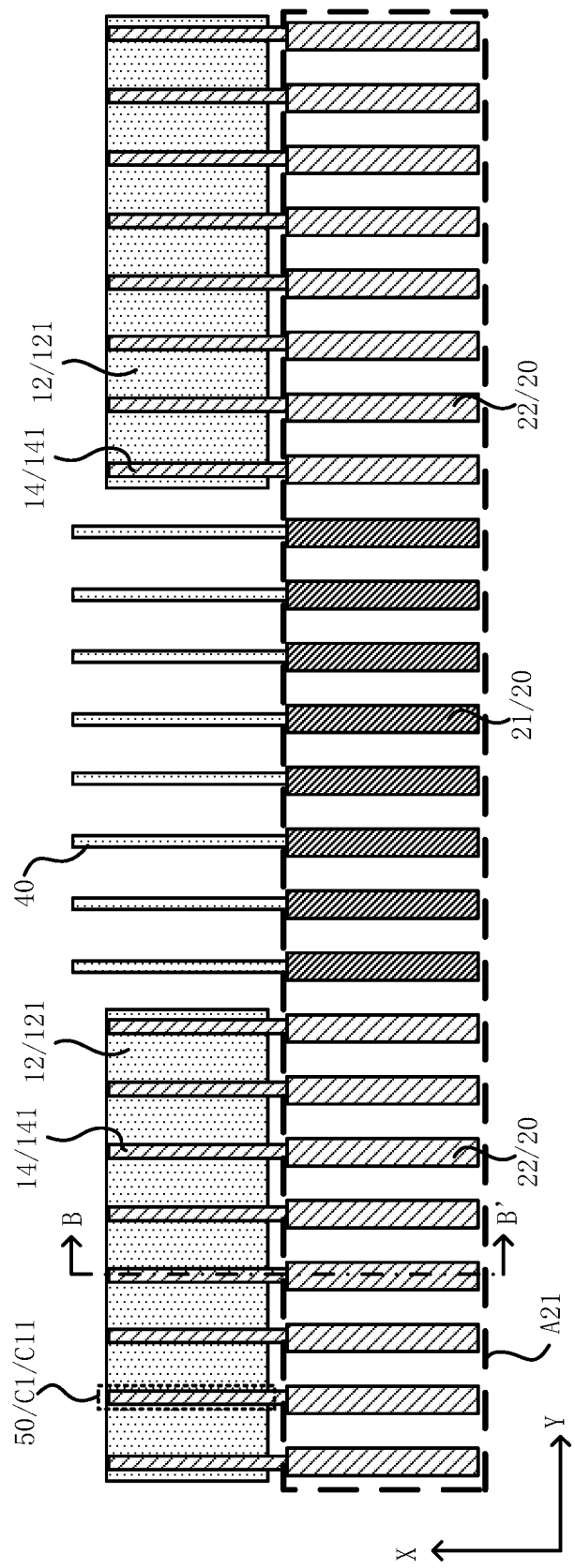
FIG. 2 illustrates a structural schematic of a second sub-region in a substrate module in FIG. 1.
Figure 3:
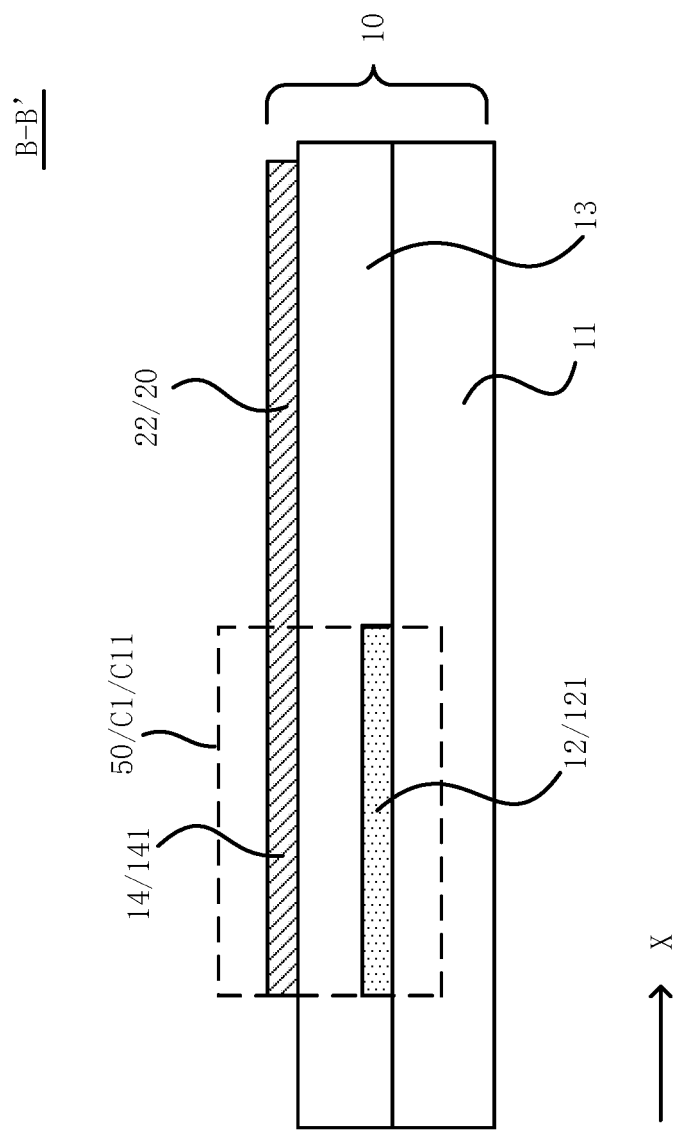
FIG. 3 illustrates a cross-sectional view of a substrate module along a B-B' direction in FIG. 2.

FIG. 1 illustrates a planar schematic of a substrate module according to various embodiments of the present disclosure; FIG. 2 illustrates a structural schematic of a second sub-region in the substrate module in FIG. 1; and FIG. 3 illustrates a cross-sectional view of the substrate module along a B-B' direction in FIG. 2. Referring to FIGS. 1-3, various embodiments may provide a substrate module. The substrate module may include a first substrate 10; the first substrate 10 may include a first sub-region A1 and a second sub-region A2; the second sub-region A2 may be on a side of the first sub-region A1 along the first direction X; the second sub-region A2 may include a binding region A21; the binding region A21 may include a plurality of first pins 20 arranged along the second direction Y; and the first pin 20 may be configured for electrical connection with the pin in the drive chip (not shown in FIGS. 1-3), where the first direction X may intersect the second direction Y. Optionally, the first direction X may be perpendicular to the second direction Y.

Optionally, in the COG (Chip on Glass) process, the pins in the drive chip may be directly electrically connected to the first pins 20 in the substrate module. Optionally, in the COF (Chip on Flex) process, the pins in the drive chip may be electrically connected to the pins in the flexible circuit board (not shown in FIGS. 1-3), and the pins in the flexible circuit board may be electrically connected to the first pins 20 in the substrate module, thereby realizing that the pins in the drive chip may be electrically connected to the first pins in the substrate module.

The plurality of first pins 20 in the first substrate 10 may include at least one first sub-pin 21. The first sub-region A1 may include a plurality of first loads 30. The first sub-pin 21 may be electrically connected to the first load 30. When the devices in the first sub-region A1 need to be driven and controlled by the drive chip, the first sub-pins 21 may be electrically connected to the pins of the drive chip. Optionally, the second sub-region A2 may further include a fan-out line 40, and the first sub-pin 21 may be electrically connected to the first load 30 in the first sub-region A1 through the fan-out line 40.

The plurality of first pins 20 in the first substrate 10 may further include at least one second sub-pin 22. The second sub-region A2 may include at least one second load 50; and the second sub-pin 22 may be electrically connected to the second load 50. When the number of pins in the drive chip is greater than the number of the first sub-pins 21 in the first substrate 10, the pins in the drive chip that are not electrically connected to the first sub-pin 21 may be extra pins. The extra pins in the drive chip have the function of outputting signals. The extra pins in the drive chip may be electrically connected to the second sub-pins 22. The second loads 50 may be disposed in the second sub-region A2, and the second sub-pins 22 may be electrically connected to the second loads 50, so that extra pins in the drive chip may be electrically connected to the second loads 50. Therefore, certain pins in the drive chip may be avoided to be in a floating state, and the working performance of the drive chip may be effectively improved.

Meanwhile, since the pins in the drive chip that are not electrically connected to the first sub-pins 21 may be electrically connected to the second sub-pins 22, that is, pins in the drive chip that are not electrically connected to the first sub-pins 21 may be electrically connected to the second loads 50. Therefore, the number of pins in the drive chip may not need to be same as the number of the first sub-pins 21 in the first substrate 10. In such way, it may avoid that one drive chip may only be applied to a substrate with a specific number of first sub-pins 21, and the application scope of the drive chip may be effectively expanded; and there is no need to provide different drive chips for substrates with different numbers of the first sub-pins 21, which may effectively reduce the fabrication cost.

For example, the second load 50 may include a capacitor C1; and the capacitor C1 may include a first capacitor C11. The first substrate 10 may include a first base substrate 11, and include a first electrode layer 12, a first insulating layer 13 and a second electrode layer 14 which are sequentially arranged on a side of the first base substrate 11. The first insulating layer 13 may be disposed between the first electrode layer 12 and the second electrode layer 14, so that the first electrode layer 12 and the second electrode layer 14 may be insulated from each other. The first electrode layer 12 may include a first electrode portion 121; the second electrode layer 14 may include a second electrode portion 141; and the first electrode portion 121 and the second electrode portion 141 may be insulated from each other. Along the direction perpendicular to the plane where the base substrate 11 is located, the first electrode portion 121 and the second electrode portion 141 may be at least partially overlapped with each other. The overlapping portion of the first electrode portion 121 and the second electrode portion 141 may form the first capacitor C11. The first electrode portion 121 and the second electrode portion 141 may be both disposed in the second sub-region A2. Along the direction perpendicular to the plane of the base substrate 11, the overlapping portion of the first electrode portion 121 and the second electrode portion 141 may form the first capacitor C11, so that the first capacitor C11 may be disposed in the second sub-region A2. The second electrode portion 141 of the first capacitor C11 may be electrically connected to the second sub-pin 22, so that the second sub-pin 22 may be electrically connected to the first capacitor C11.

It should be noted that, FIGS. 1-2 exemplarily illustrate that the first substrate 10 includes eight first sub-pins 21 and sixteen second sub-pins 22. In other embodiments of the present disclosure, the first substrate 10 may further include other numbers of first sub-pins 21 and second sub-pins 22, which may not be limited in the present disclosure.

It should be noted that in the present disclosure, all first pins 20 (the first sub-pins 21 and the second sub-pins 22) may be disposed in a same layer. The first sub-pin 21 and the second sub-pin 22 in FIGS. 1-2 use different patterns to mark the first sub-pin 21 and the second sub-pin 22 which may be only for the purpose of clearly illustrating the first sub-pin 21 and the second sub-pin 22 and may not indicate that the first sub-pin 21 and the second sub-pin 22 are disposed in different film layers. Related labeling manners are also applied in the drawings of other embodiments of the present disclosure, which may not be described in detail in the present disclosure.

Figure 4:
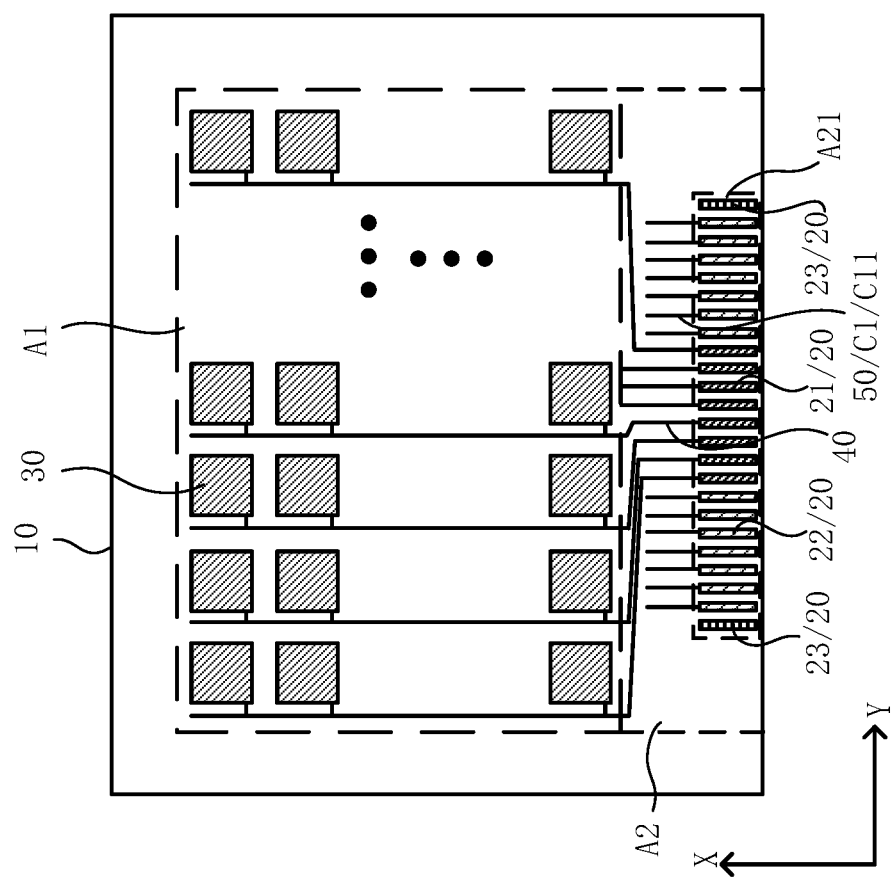
FIG. 4 illustrates a planar schematic of another substrate module according to various embodiments of the present disclosure.
Figure 5:
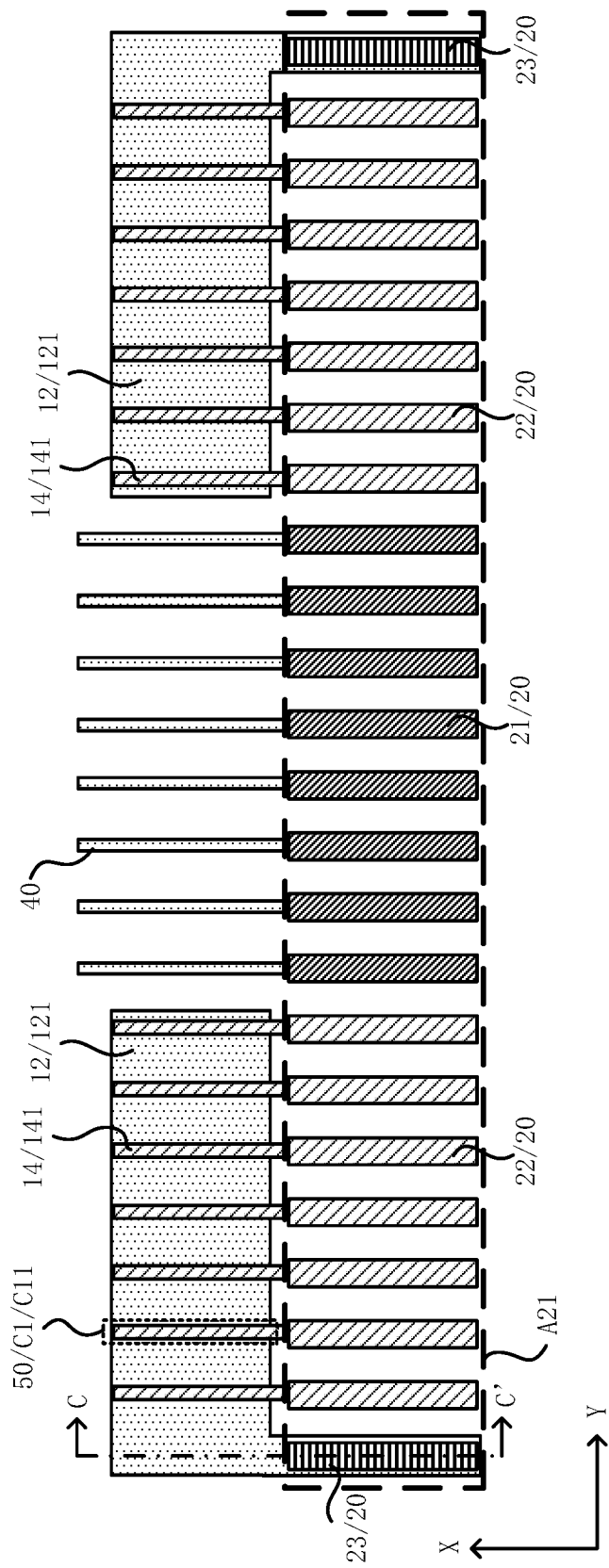
FIG. 5 illustrates a structural schematic of a second sub-region in a substrate module in FIG. 4.
Figure 6:
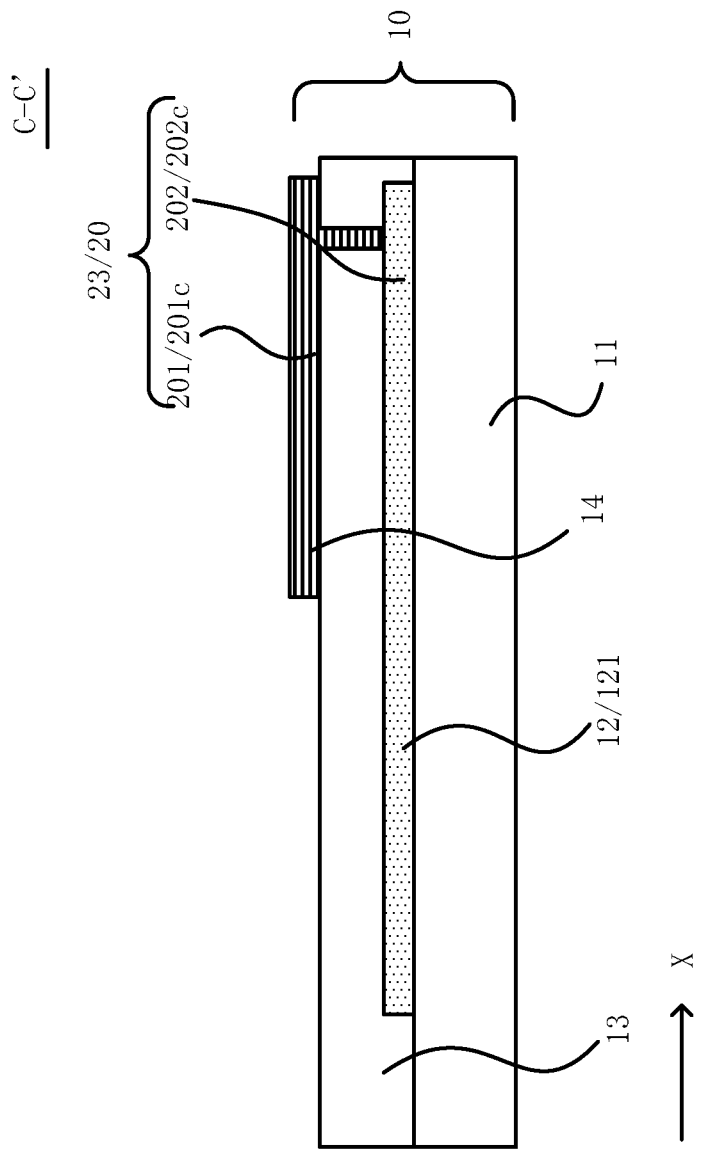
FIG. 6 illustrates a cross-sectional view of a substrate module along a C-C' direction in FIG. 5.

FIG. 4 illustrates a planar schematic of another substrate module according to various embodiments of the present disclosure; FIG. 5 illustrates a structural schematic of the second sub-region in the substrate module in FIG. 4; and FIG. 6 illustrates a cross-sectional view of the substrate module along a C-C' direction in FIG. 5. Referring to FIGS. 4-6, in some optional embodiments, the plurality of first pins 20 in the first substrate 10 may further include at least one third sub-pin 23. The first electrode portion 121 may be electrically connected to the third sub-pin 23. The drive chip may transmit signals to the first electrode portion 121 through the third sub-pin 23 and transmit signals to the second electrode portion 141 through the second sub-pin 22, so that different signals may be transmitted to the first electrode portion 121 and the second electrode portion 141 respectively. Therefore, along the direction perpendicular to the plane of the base substrate 11, the overlapping portion of the first electrode portion 121 and the second electrode portion 141 may form the first capacitor C11.

Optionally, the drive chip may transmit a common voltage signal to the first electrode portion 121 through the third sub-pin 23, that is, the first pin 20 configured for transmitting the common voltage signal in the first base 10 may be reused as the third sub-pin 23, which may be beneficial for reducing the area of the second sub-region A2 and reduce the fabrication cost.

Referring to FIGS. 4-6, in some optional embodiments, the first capacitor C1 may be between the first sub-region A1 and the binding region A21.

For example, the region between the first sub-region A1 and the binding region A21 may be a wiring region. The fan-out line 40 electrically connected to the first sub-pin 21 may be located in the wiring region. The first capacitor C1 may be located between the first sub-region A1 and the binding region A21. That is, the first capacitor C1 may be disposed in the wiring region of the first substrate 10, thereby effectively reducing the area of the second sub-region A2.

Figure 7:
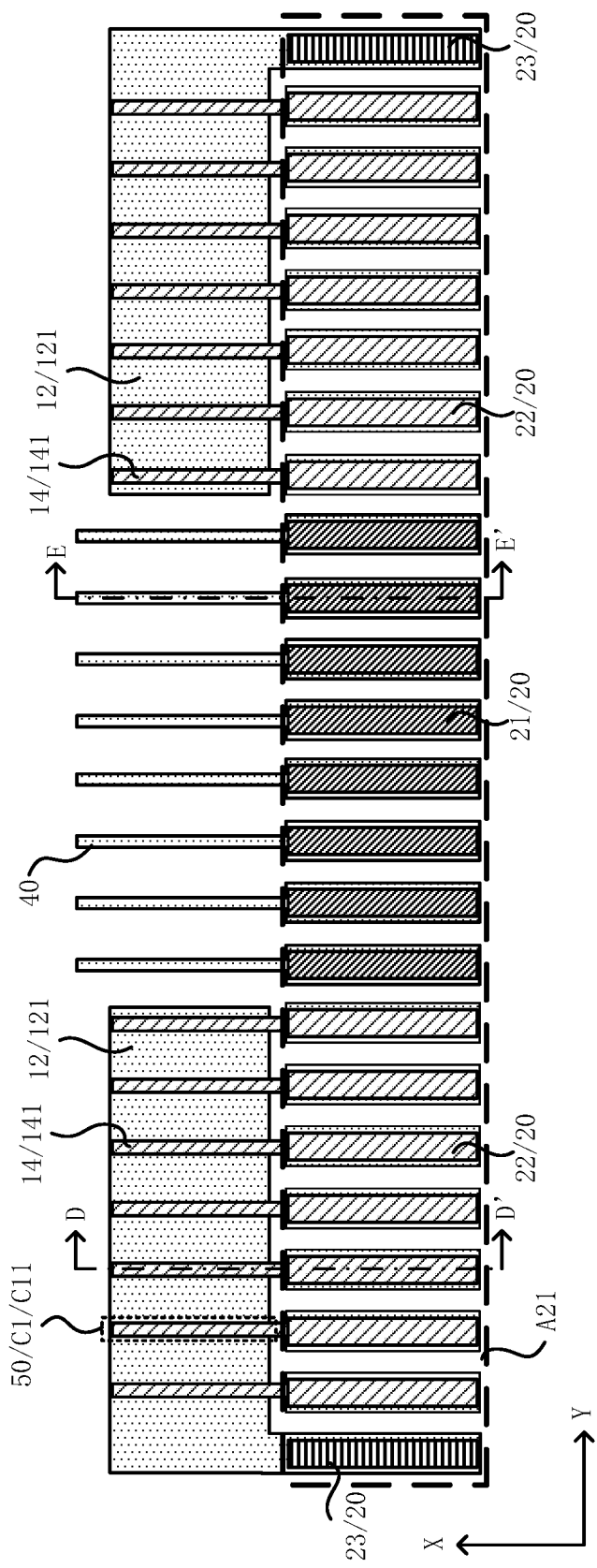
FIG. 7 illustrates another structural schematic of a second sub-region in a substrate module in FIG. 4.
Figure 8:
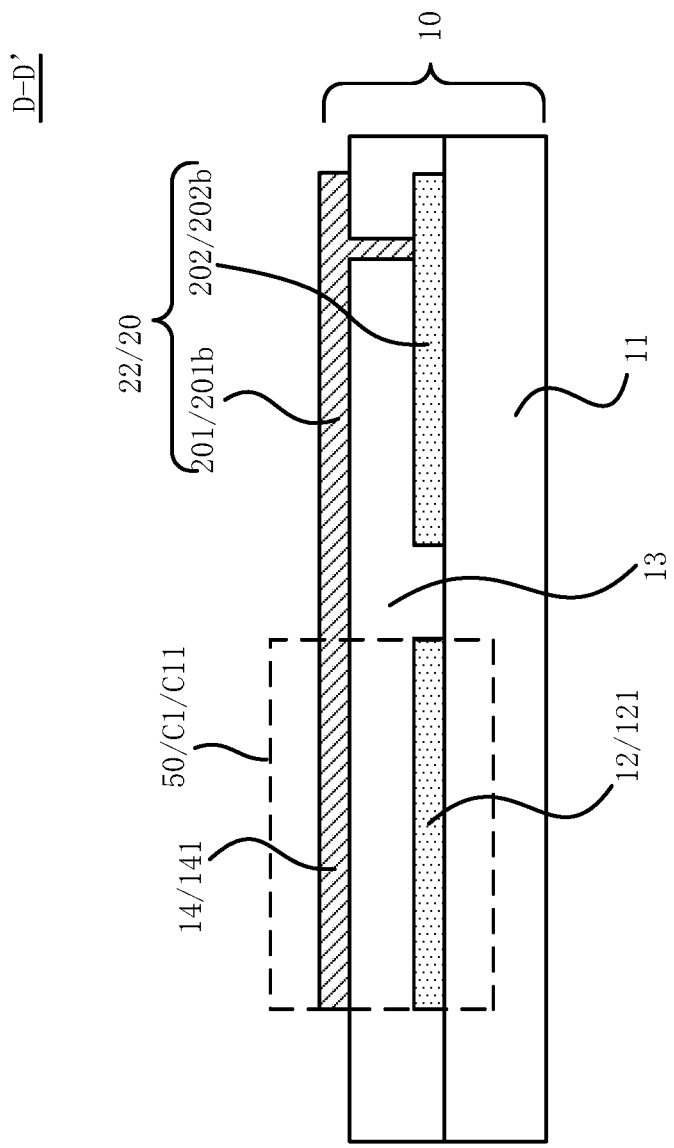
FIG. 8 illustrates a cross-sectional view of a substrate module along a D-D' direction in FIG. 7.
Figure 9:
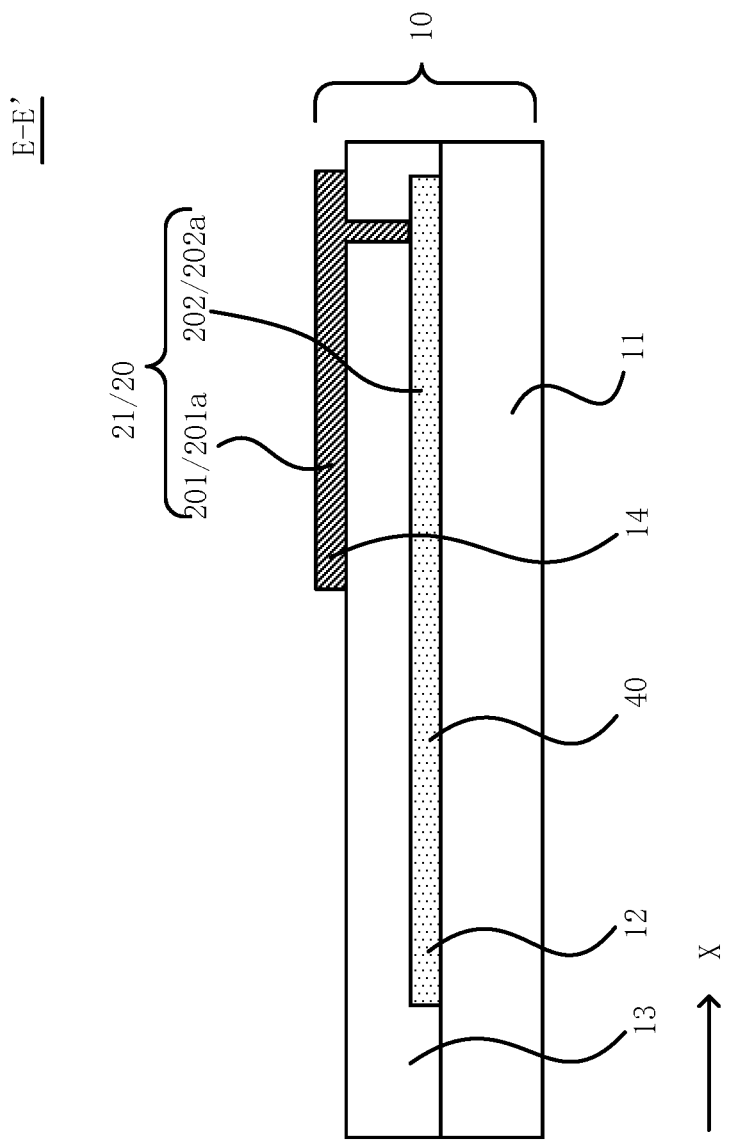
FIG. 9 illustrates a cross-sectional view of a substrate module along a E-E' direction in FIG. 7.

FIG. 7 illustrates another structural schematic of the second sub-region in the substrate module in FIG. 4; FIG. 8 illustrates a cross-sectional view of the substrate module along a D-D' direction in FIG. 7; and FIG. 9 illustrates a cross-sectional view of the substrate module along a E-E' direction in FIG. 7. Referring to FIGS. 4 and 7-9, the structure of the third sub-pin 23 in the substrate module described in FIG. 7 refers to FIG. 6. In some optional embodiments, the first pin 20 may include a first sub-portion 201 and a second sub-portion 202 which are electrically connected with each other, the first sub-portion 201 may be located at the second electrode layer 14, and the second sub-portion 202 may be located at the first electrode layer 12. That is, the first sub-portion 201 and the second sub-portion 202 in the first pin 20 may be connected in parallel, which may effectively improve the conductivity of the first pin 20.

Each first pin 20 in the first substrate 10 may be designed in a same manner. For example, the first sub-pin 21 may include a first sub-portion 201a and a second sub-portion 202a which are electrically connected with each other. In the first sub-pin 21, the first sub-portion 201a may be located in the second electrode layer 14, and the second sub-portion 202a may be located in the first electrode layer 12. The second sub-pin 22 may include a first sub-portion 201b and a second sub-portion 202b which are electrically connected with each other. In the second sub-pin 22, the first sub-portion 201b may be located in the second electrode layer 14, and the second sub-portion 202b may be located in the first electrode layer 12. The third sub-pin 23 may include a first sub-portion 201c and a second sub-portion 202c which are electrically connected with each other. In the third sub-pin 23, the first sub-portion 201c may be located in the second electrode layer 14, and the second sub-portion 202c may be located in the first electrode layer 12. The structures of the first sub-pin 21, the second sub-pin 22 and the third sub-pin 23 may use a same design manner, which may be beneficial for improving the reliability of all first sub-pins 20.

The second sub-portion 202a of the first sub-pin 21 may be insulated from the first electrode portion 121, thereby avoiding mutual signal interference between the first sub-pin 21 and the first electrode portion 121.

Both the second sub-portion 202b and the first electrode portion 121 in the second sub-pin 22 may be located in the first electrode layer 12; and both the second sub-portion 202b and the first electrode portion 121 in the second sub-pin 22 may be insulated from each other. Therefore, the signals of the first electrode portion 121 and the second electrode portion 141 may be prevented from being same; and along the direction perpendicular to the plane of the base substrate 11, the overlapping portion of the first electrode portion 121 and the second electrode portion 141 may form the first capacitor C11.

Both the second sub-portion 202c and the first electrode portion 12 in the third sub-pin 23 may be in the first electrode layer 12; and the second sub-portion 202c in the third sub-pin 23 may be connected to the first electrode portion 12 to realize the electrical connection between the second sub-portion 202c and the first electrode portion 12 in the third sub-pin 23.

Figure 10:
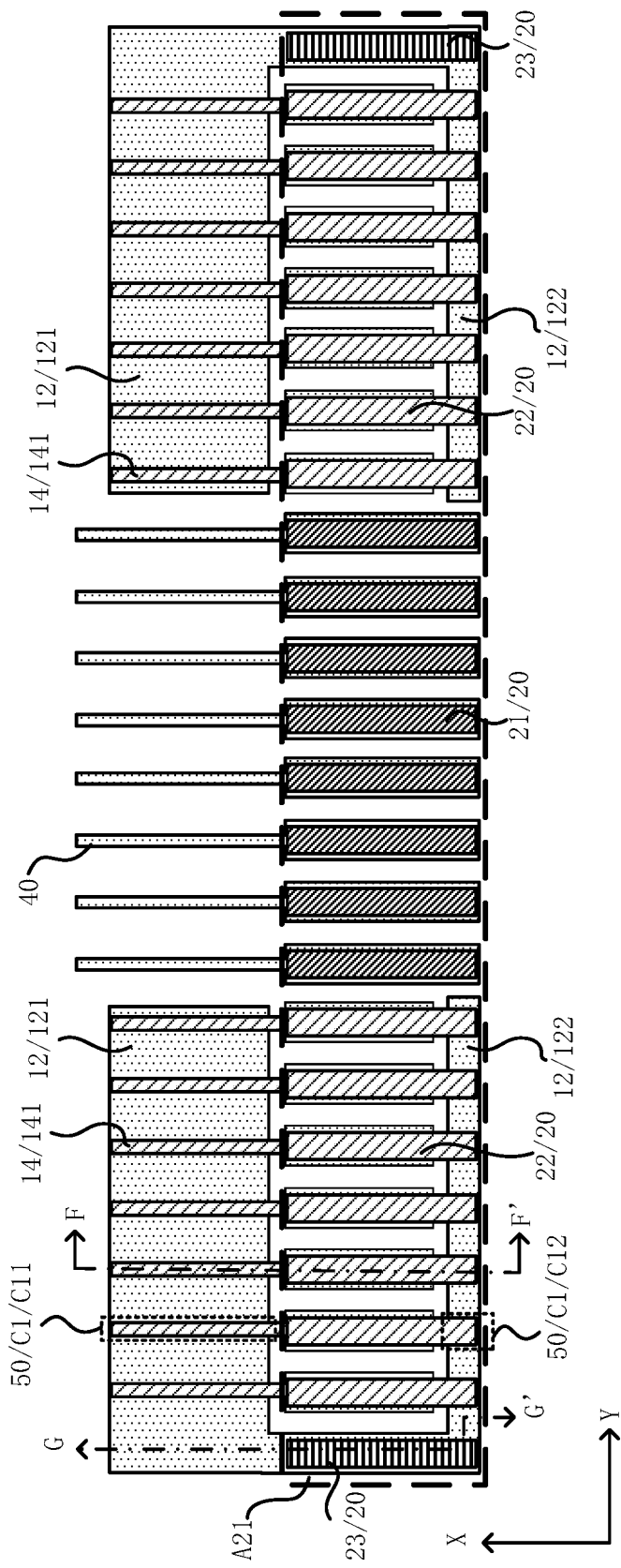
FIG. 10 illustrates another structural schematic of a second sub-region in a substrate module in FIG. 4.
Figure 11:
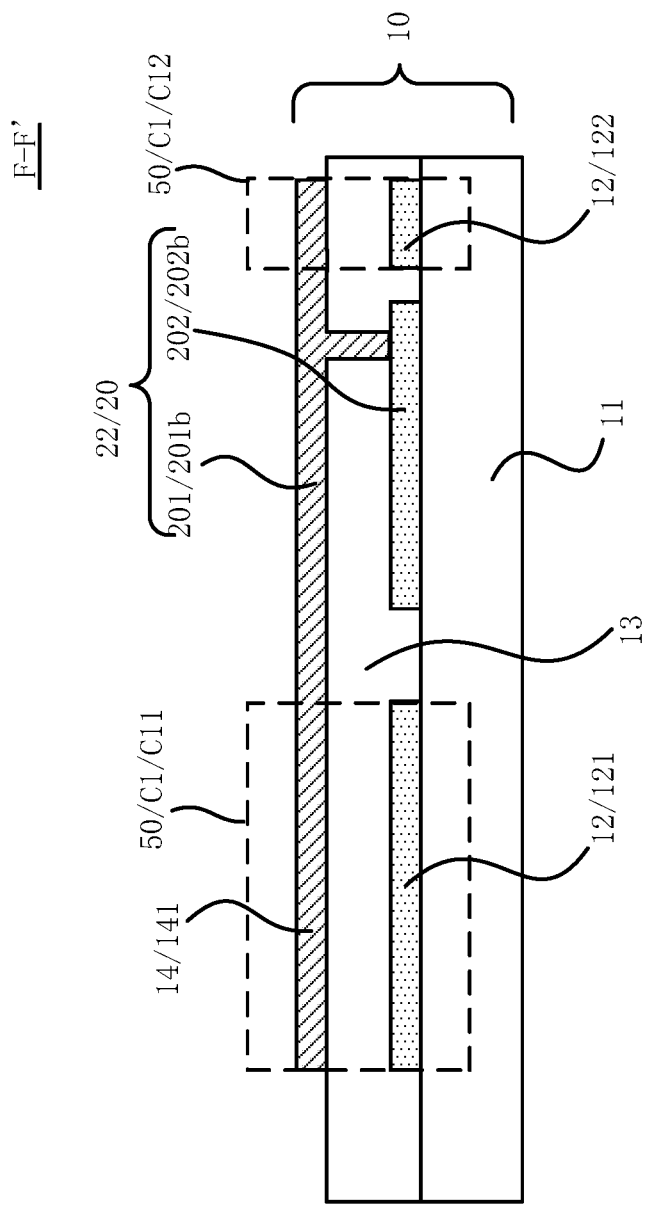
FIG. 11 illustrates a cross-sectional view of a substrate module along a F-F' direction in FIG. 10.

FIG. 10 illustrates another structural schematic of the second sub-region in the substrate module in FIG. 4; and FIG. 11 illustrates a cross-sectional view of the substrate module along a F-F' direction in FIG. 10. Referring to FIGS. 4, 10 and 11, the structure of the first sub-pin 21 in the substrate module shown in FIG. 10 refers to FIG. 9; and in some optional embodiments, the capacitive load C1 further may include a second capacitor C12.

For example, the first electrode layer 12 may further include a third electrode portion 122. The third electrode portion 122 may be located in the binding region A21. The third electrode portion 122 may be located on the side of the second sub-portion 201 in the second sub-pin 22 away from the first electrode portion 121. The second sub-portion 202a in the first sub-pin 21, the second sub-portion 202b in the second sub-pin 22, and the third electrode portion 122 may all be located in the first electrode layer 12; and the second sub-portion 202a in the first sub-pin 21 and the second sub-portion 202b in the second sub-pin 22 may both be insulated from the third electrode portion 122. Therefore, the signals on the first sub-pin 21, the second sub-pin 22 and the third electrode portion 122 may be prevented from interfering with each other.

Along the direction perpendicular to the plane of the base substrate 11, the first sub-portion 201b in the second sub-pin 22 may be at least partially overlapped with the third electrode portion 122, and the second sub-portion 202b in the second sub-pin 22 may be insulated from the third electrode portion 122. Therefore, along the direction perpendicular to the plane of the base substrate 11, the overlapping portion of the first sub-portion 201b in the second sub-pin 22 and the third electrode portion 122 may form the second capacitor C12.

In the first substrate 10, by reusing the first sub-portion 201b in the second sub-pin 22 as a side electrode of the second capacitor C12, the second capacitor C12 may be formed in the binding region A21, which may satisfy total load requirement of the second load 50 and be beneficial for reducing the capacitance of the first capacitor C12. Therefore, it is beneficial for reducing the area of the overlapping portion of the first electrode portion 121 and the second electrode portion 141 along the direction perpendicular to the plane of the base substrate 11 and reduce the area of the second sub-region A2.

Figure 12:
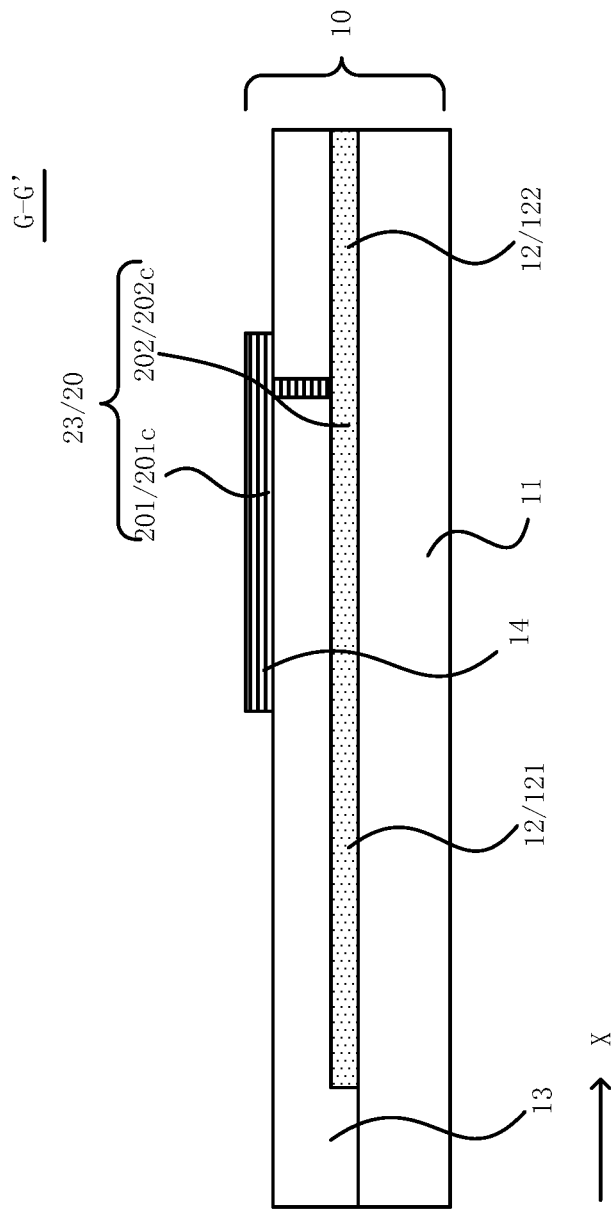
FIG. 12 illustrates a cross-sectional view of a substrate module along a G-G' direction in FIG. 10.

FIG. 12 illustrates a cross-sectional view of the substrate module along a G-G' direction in FIG. 10. Referring to FIGS. 4, and 10-12, in some optional embodiments, the third electrode portion 122 may be electrically connected to the third sub-pin 23, the drive chip may transmit signals to the third electrode portion 122 through the third sub-pin 23, and the signals on the first sub-portion 201b in the second sub-pin 22 and the third electrode portion 122 may be different. Therefore, along the direction perpendicular to the plane of the base substrate 11, the overlapping portion of the first sub-portion 201b and the third electrode portion 122 in the second sub-pin 22 may form the second capacitor C12.

In addition, the drive chip may transmit signals to both the first electrode portion 121 and the third electrode portion 122 through the third sub-pin 23, and there is no need to additionally set the first pin 20 to transmit signals to the third electrode portion 122, which may be beneficial for reducing the area of the binding region A21 and reduce the production cost.

Figure 13:
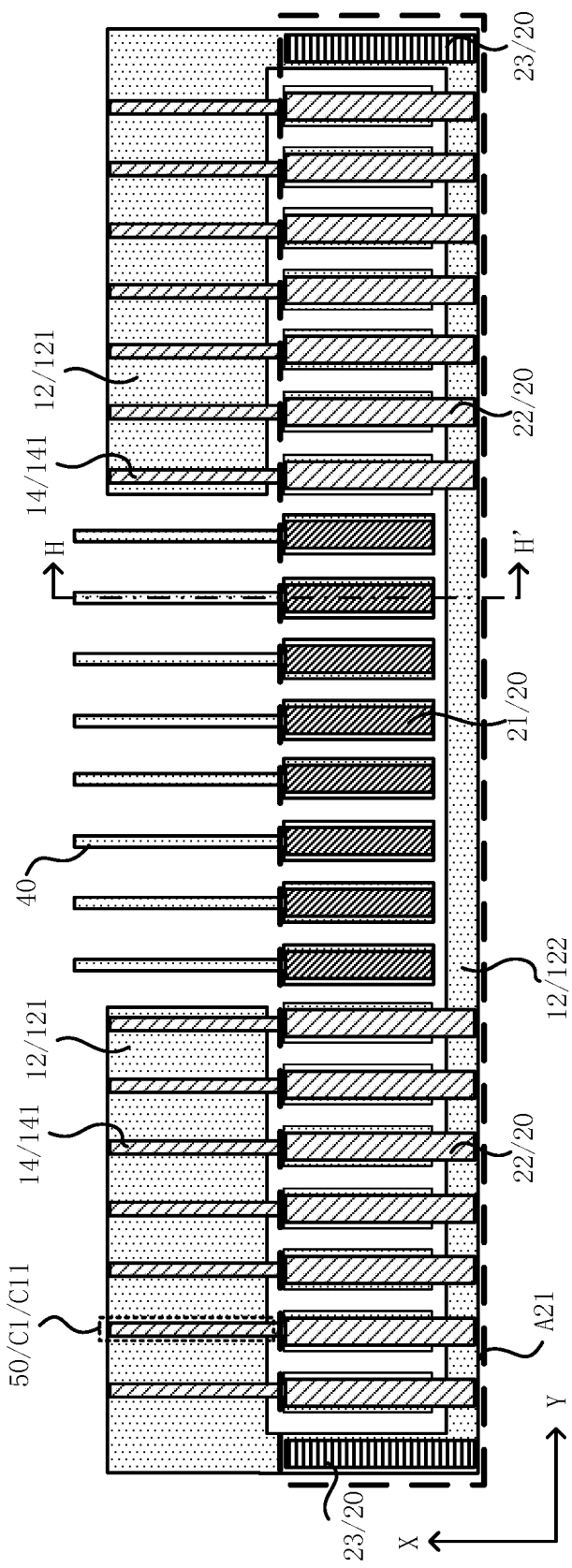
FIG. 13 illustrates another structural schematic of a second sub-region in a substrate module in FIG. 4.

FIG. 13 illustrates another structural schematic of the second sub-region in the substrate module in FIG. 4. Referring to FIGS. 4 and 13, in some optional embodiments, the third electrode portions 122, which may each form the second capacitor C12 with the first sub-portion 201b in each second sub-pin 22, may be connected to each other to form an integral structure, which may be beneficial for improving the uniformity of the signals on the third electrode portion 122.

Figure 14:
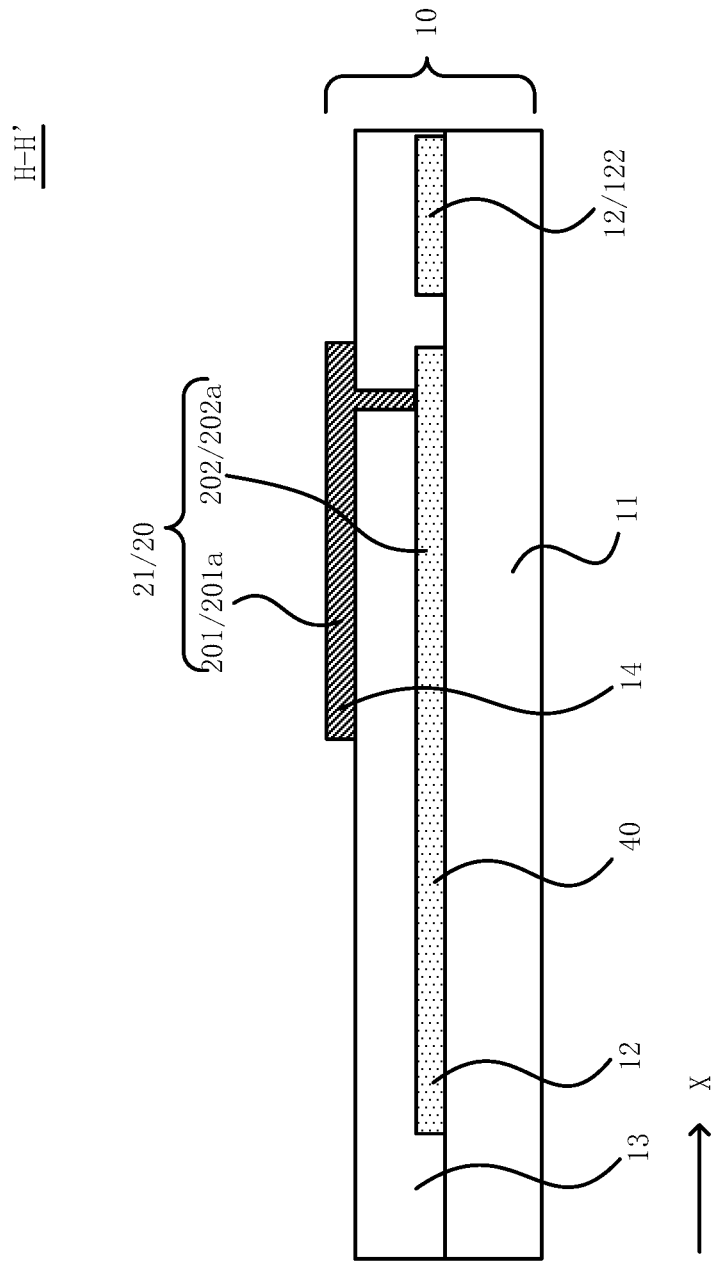
FIG. 14 illustrates a cross-sectional view of a substrate module along a H-H' direction in FIG. 13.

FIG. 14 illustrates a cross-sectional view of the substrate module along a H-H' direction in FIG. 13. Referring to FIGS. 4, 13 and 14, in some optional embodiments, along the direction perpendicular to the plane of the base substrate 11, the first sub-portion 201a and the third electrode portion 122 in the first sub-pin 21 may not be overlapped with each other. Therefore, the formation of capacitance between the first sub-portion 201a and the third electrode portion 122 in the first sub-pin 21 may be avoided, and the influence of the setting of the third electrode portion 122 to the signal on the first sub-pin 21 may be avoided, which may ensure normal operation of the devices in the first sub-region A1.

Figure 15:
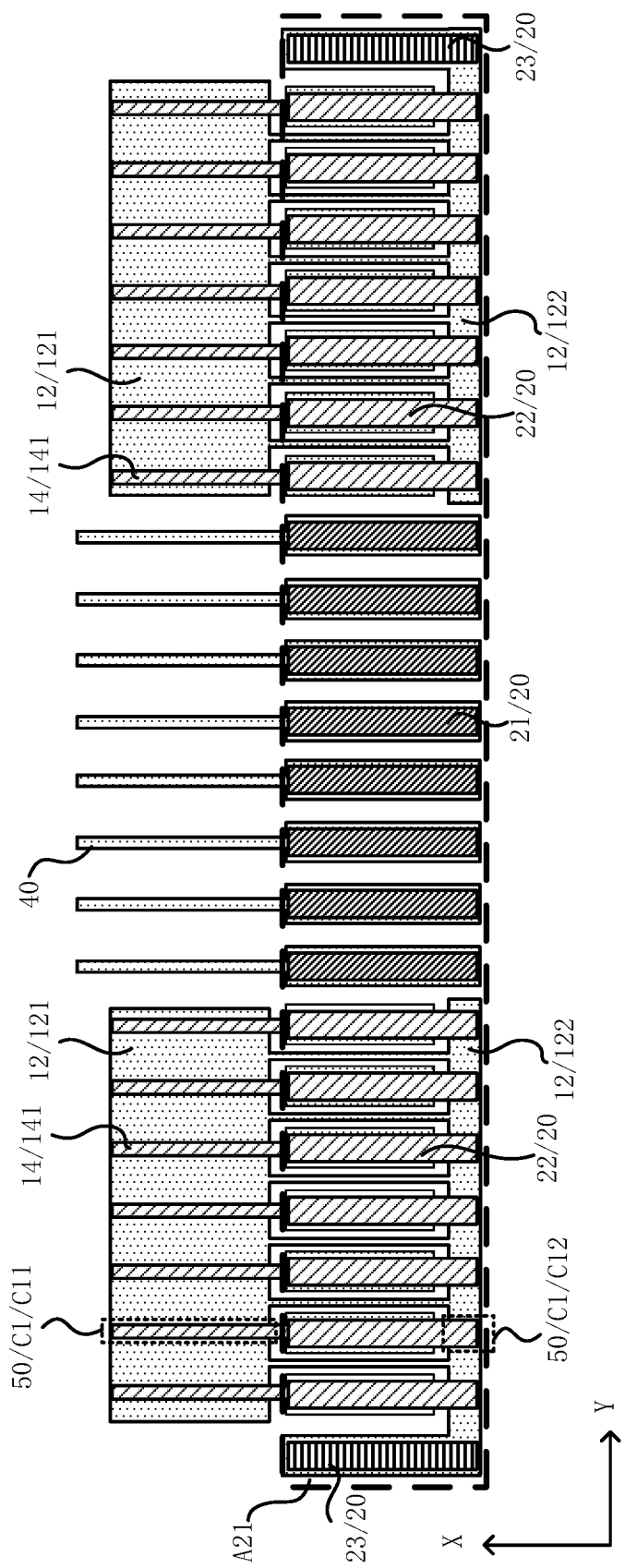
FIG. 15 illustrates another structural schematic of a second sub-region in a substrate module in FIG. 4.

It should be noted that, referring to FIG. 10, the first electrode portion 121 and the third electrode portion 122 may be electrically connected to the third sub-pin 23 respectively, and signals may be simultaneously transmitted to the first electrode portion 121 and the third electrode portion 122 through the third sub-pin 23. In other embodiments of the present disclosure, referring to FIG. 15, FIG. 15 illustrates another structural schematic of the second sub-region in the substrate module in FIG. 4. Optionally, the first electrode portion 121 may be connected to the third electrode portion 122, and the third electrode portion 122 may be electrically connected to the third sub-pin 23. Therefore, signals may be simultaneously transmitted to the first electrode portion 121 and the third electrode portion 122 through the third sub-pin 23. Obviously, in other embodiments of the present disclosure, the first electrode portion 121 may be connected to the third electrode portion 122, and the first electrode portion 121 may be electrically connected to the third sub-pin 23. Therefore, signals may be simultaneously transmitted to the first electrode portion 121 and the third electrode portion 122 through the third sub-pin 23, which may not be described in detail herein.

Figure 16:
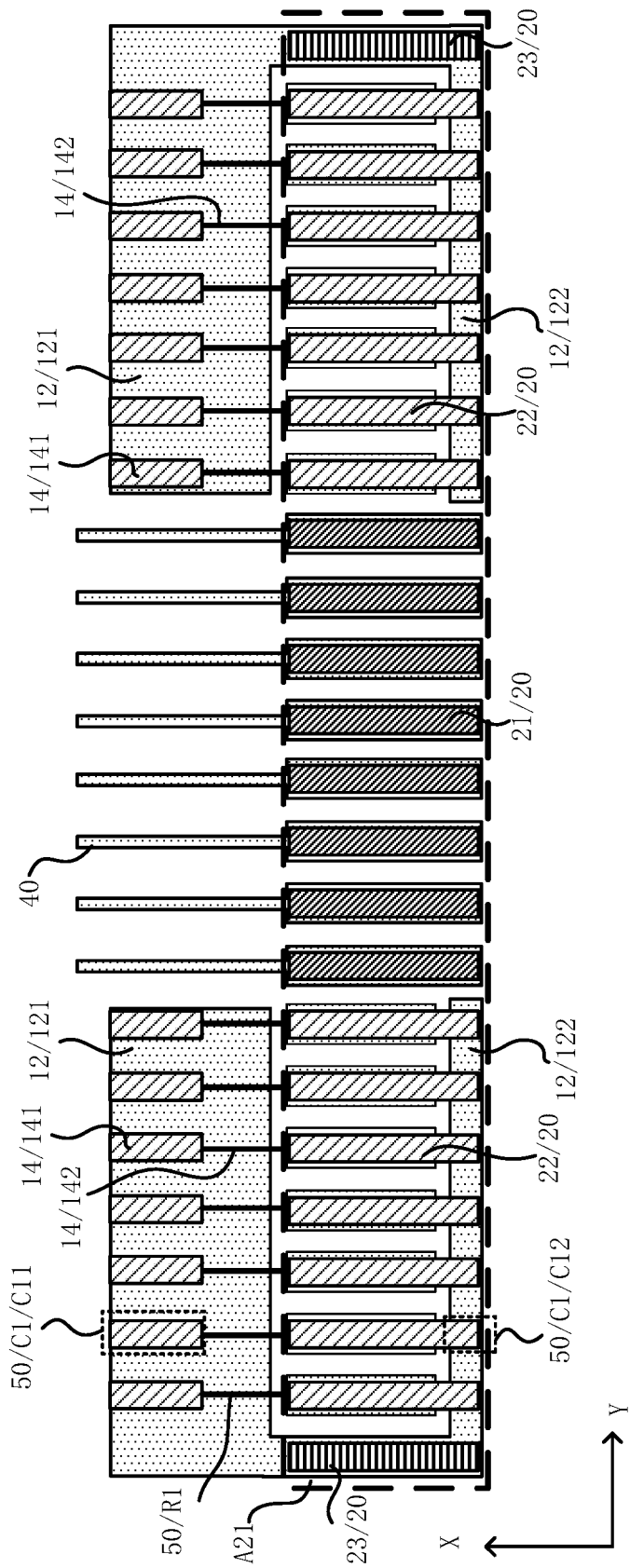
FIG. 16 illustrates another structural schematic of a second sub-region in a substrate module in FIG. 4.

FIG. 16 illustrates another structural schematic of the second sub-region in the substrate module in FIG. 4. Referring to FIGS. 4 and 16, in some optional embodiments, the second load 50 may further include a resistor R1. The second electrode layer 14 may further include a first wiring 142. The first wiring 142 may be electrically connected to the second sub-pin 22, and the first wiring 142 may form the resistor R1. The load capacity of the second load 50 may be flexibly adjusted through the settings of the resistor R1 and the capacitor C1.

The second electrode portion 141 and the second sub-pin 22 may be electrically connected through the first wiring 142, that is, the resistor R1 and the first capacitor C1 in the second load 50 may be connected in series.

It should be noted that the resistor R1 in the second load 50 connected in series with the first capacitor C1 may be exemplarily shown in one embodiment. In other embodiments of the present disclosure, the resistor R1 in the second load 50 and the first capacitor C1 may also use other connection manners according to actual production requirements, which may not be described in detail herein.

Figure 17:
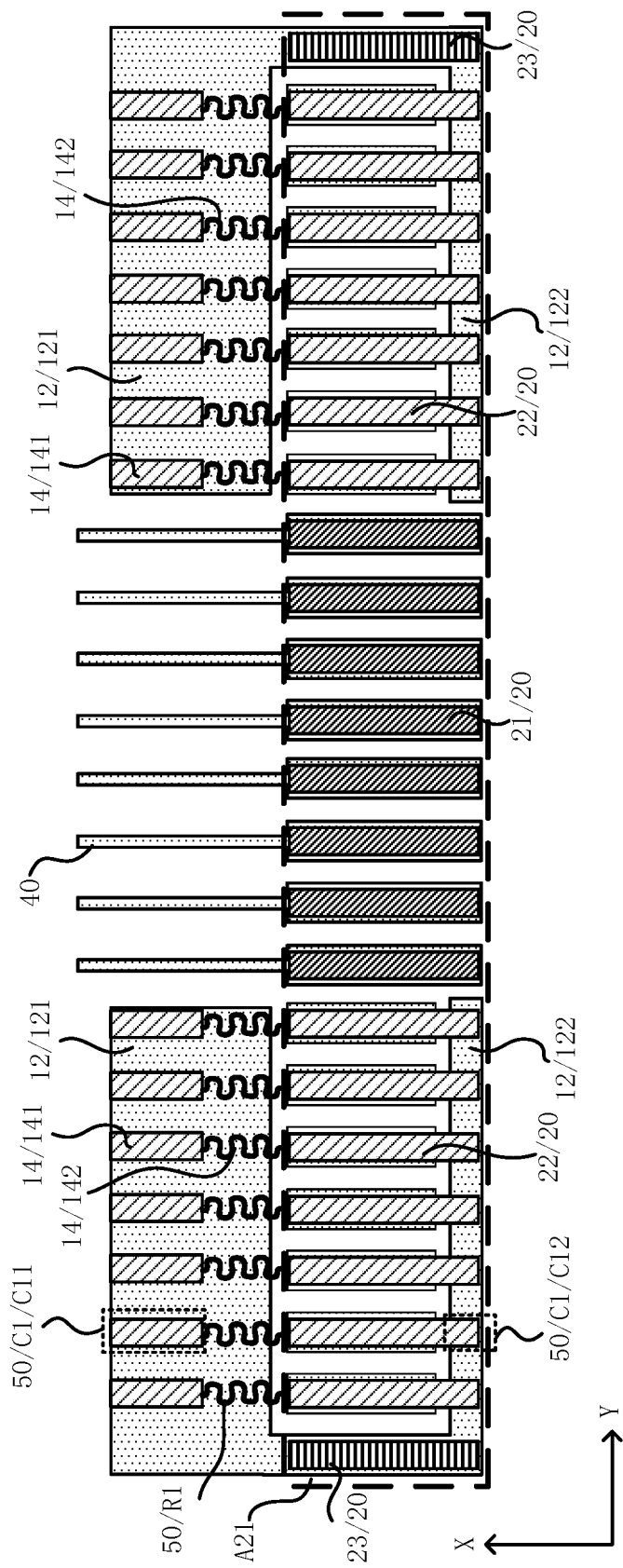
FIG. 17 illustrates another structural schematic of a second sub-region in a substrate module in FIG. 4.

FIG. 17 illustrates another structural schematic of the second sub-region in the substrate module in FIG. 4. Referring to FIGS. 4 and 17, in some optional embodiments, the first trace 142 may be a serpentine wiring structure, which may be beneficial for reducing the length of the first trace 142 along the first direction X while the resistance of the resistor R1 remains unchanged, thereby being beneficial for reducing the width of the second sub-region A2 in the first direction X.

It should be noted that in one embodiment, it exemplarily shows that the first wiring 142 may be a serpentine wiring structure. In other embodiments of the present disclosure, the first wiring 142 may also use other bending settings, which may not be described in detail herein.

Referring to FIGS. 4 and 17, in some optional embodiments, along the second direction Y, the first sub-pin 21 may not be disposed between at least two adjacent second sub-pins 22, that is, only at least two second sub-pins 22 may be disposed in a partial region; the first electrode portions 121 electrically connected to the second sub-pins 22 in such region may be connected to each other to form an integral structure, which may facilitate the arrangement of the first electrode portions 121, reduce the region that needs to be etched between the first electrode portions 121 and the fan-out lines 40, thereby reducing the risk of connection between the first electrode portions 121 and the fan-out lines 40.

Optionally, along the second direction Y, the second sub-pin 22 may not be disposed between any two adjacent first sub-pins 21, that is, all first sub-pins 21 may be disposed together to form a first sub-pin group. Therefore, the second sub-pins 22 may be disposed on a side of the first sub-pin group along the second direction Y; and along the second direction Y, the first electrode portions 121 electrically connected to the second sub-pins 22 located on a same side of the first sub-pin group may be connected to each other to form an integral structure. In such way, the region that need to be etched between the first electrode portions 121 and the fan-out lines 40 may be further reduced, and the risk of connection between the first electrode portions 121 and the fan-out lines 40 may be further reduced.

Figure 18:
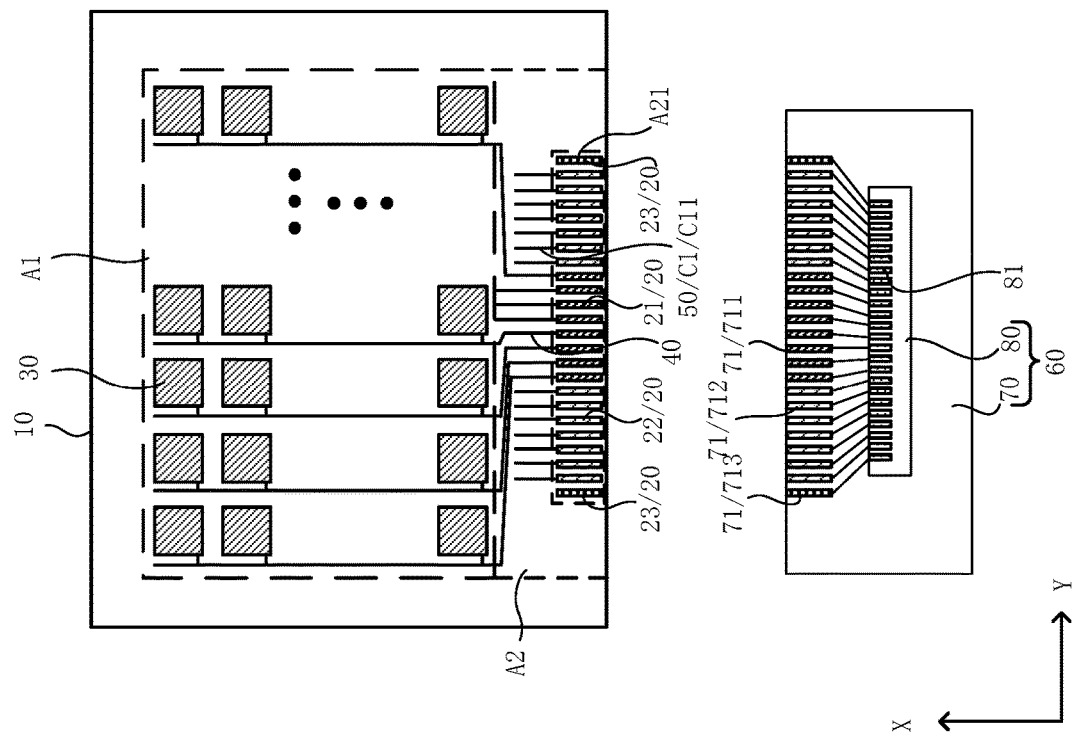
FIG. 18 illustrates a planar schematic of another substrate module according to various embodiments of the present disclosure.

FIG. 18 illustrates a planar schematic of another substrate module according to various embodiments of the present disclosure. In some optional embodiments, the substrate module may further include a chip on film 60. The chip on film 60 may include a flexible circuit board 70 and a drive chip 80 fixed on the flexible circuit board 70. The flexible circuit board 70 may be bent toward the side of the first substrate 10 away from the first pins 20, which may be beneficial for reducing the area of the substrate module.

The flexible circuit board 70 may include a plurality of second pins 71, the drive chip 80 may include a plurality of third pins 81, and one third pin 81 may be electrically connected to one second pin 71.

The plurality of second pins 71 in the flexible circuit board 70 may include at least one fourth sub-pin 711 and at least one fifth sub-pin 712; one fourth sub-pin 711 may be electrically connected to one first sub-pin 21; and one fifth sub-pin 713 may be electrically connected to the second sub-pin 22.

For example, in the chip on film 60, the third pin 81 in the drive chip 80 may be electrically connected to the second pin 71 in the flexible circuit board 70; and the second pin 71 in the flexible circuit board 70 may be electrically connected to the first substrate 10 in the first pin 20, so that the third pin 81 in the drive chip 80 may be electrically connected to the first pin 20 in the first substrate 10. When the number of the third pins 81 in the drive chip 80 is greater than the number of the first sub-pins 21 in the first substrate 10, correspondingly, the number of the second pins 71 in the flexible circuit board 70 may be greater than the number of the first sub-pins 21 in the first substrate 10, and a part of the second pins 71 electrically connected to the third pins 81 may not be electrically connected to the first sub-pin 21. That is, a part of the third pins 81 in the drive chip 80 may not be electrically connected to the first sub-pins 21, the third pins 81 in the drive chip 80 that are not electrically connected to the first sub-pins 21 may have the function of outputting signals, and the third pins 81 in the drive chip 80 that are not electrically connected to the first sub-pins 21 may be electrically connected to the second sub-pins 22. By disposing the second loads 50 in the second sub-region A2 and electrically connecting the second sub-pins 22 to the second loads 50, the third pins 81 in the drive chip 80 that are not electrically connected to the first sub-pins 21 may be electrically connected to the second loads 50. In such way, the third pins 81 in the drive chip 80 that are not electrically connected to the first sub-pins 21 may be prevented from being in a floating state, thereby effectively improving the working performance of the drive chip 80.

Meanwhile, the third pins 81 in the drive chip 80 that are not electrically connected to the first sub-pins 21 may be electrically connected to the second sub-pins 22 through the second pins 71 in the flexible circuit board 70, that is, the third pins 81 of the drive chip 80 that are not electrically connected to the first sub-pins 21 may be electrically connected to the second loads 50. Therefore, the number of the third pins 81 in the drive chip 80 may not need to be same as the number of the first sub-pins 21 in the first substrate 10. In such way, it may avoid that one drive chip 80 can only be applied to the substrate with a specific number of first sub-pins 21, which may effectively expand the scope of application of the drive chip 80; and there is no need to provide different drive chips 80 for substrates with different numbers of first sub-pins 21, which may effectively reduce the fabrication cost.

Optionally, in the chip on film 60, the plurality of second pins 71 in the flexible circuit board 70 may further include at least one sixth sub-pin 713; and the sixth sub-pin 713 may be configured for electrical connection with the third sub-pin 23.

It should be noted that, in one embodiment, it exemplarily illustrates that in the COF process, the third pin 81 in the drive chip 80 may be electrically connected to the first pin in the first substrate 10 through the second pin 71 in the flexible circuit board 70. In other embodiments of the present disclosure, the COG process may also be used, that is, the third pin 81 in the drive chip 80 may also be electrically connected to the first pin 20 in the first substrate directly, which may not be described in detail in the present disclosure.

Figure 19:
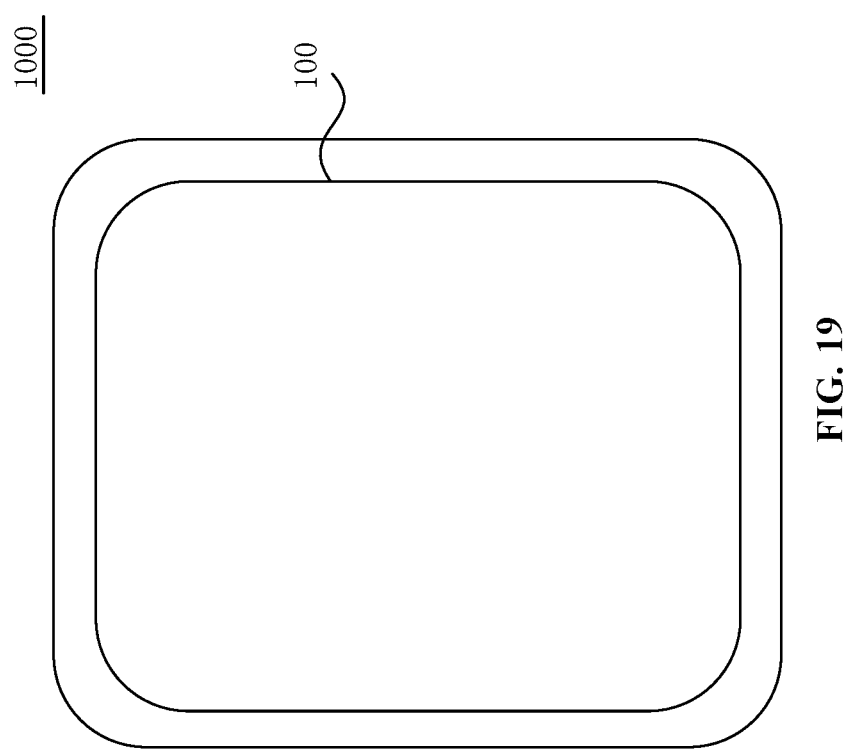
FIG. 19 illustrates a planar schematic of a display apparatus according to various embodiments of the present disclosure.

In some optional embodiments, referring to FIG. 19, FIG. 19 illustrates a planar schematic of a display apparatus according to various embodiments of the present disclosure. A display apparatus 1000 provided in one embodiment may include a substrate module 100 provided by above-mentioned embodiments of the present disclosure. In one embodiment, a mobile phone may be taken as an example to describe the display apparatus 1000 in FIG. 19. It can be understood that the display apparatus 1000 provided in the embodiment of the present disclosure may also be another display apparatus 1000 having a display function including a computer, a television, a vehicle-mounted display apparatus and the like, which may not be described in detail in the present disclosure. The display apparatus 1000 provided by embodiments of the present disclosure has the beneficial effects of the substrate module 100 provided by embodiments of the present disclosure. Details refer to specific description of the substrate module 100 in above-mentioned embodiments, which may not be described in detail in the present disclosure.

Figure 20:
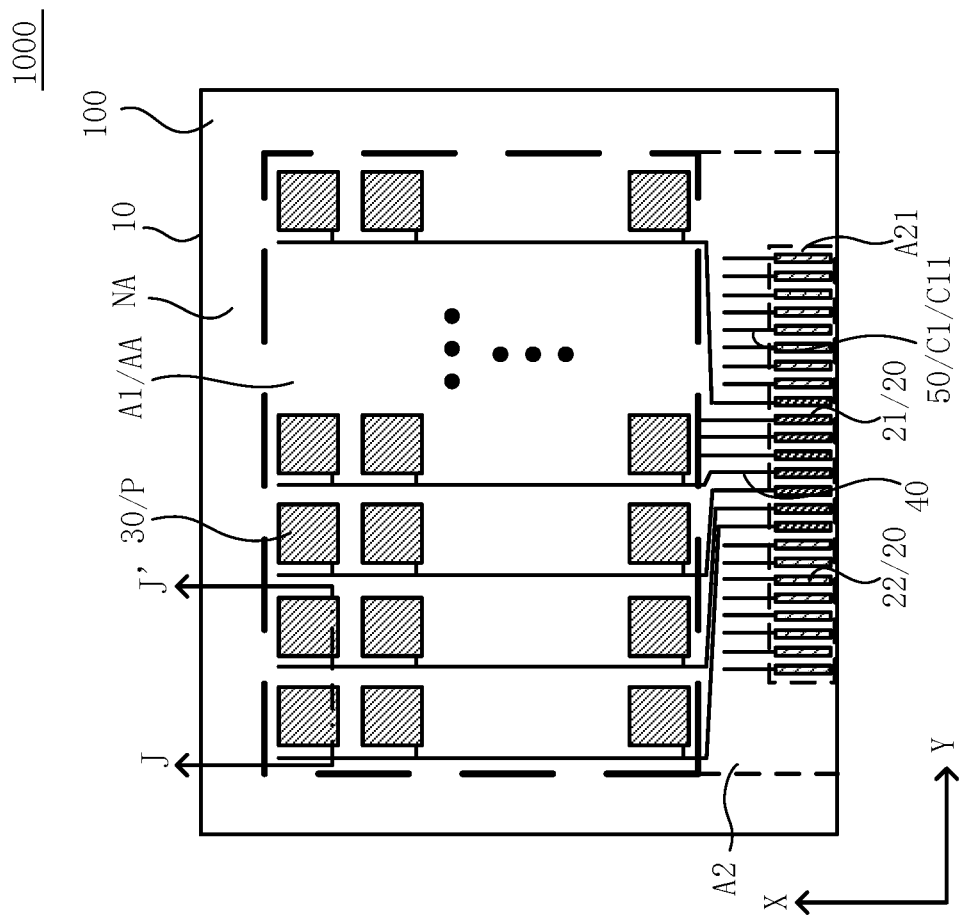
FIG. 20 illustrates a structural schematic of another display apparatus according to various embodiments of the present disclosure.

FIG. 20 illustrates a structural schematic of another display apparatus according to various embodiments of the present disclosure. Referring to FIG. 20, in some optional embodiments, the display apparatus may include a display region AA and a non-display region NA surrounding the display region AA. The display region AA may be configured for display; and the non-display region NA may not be configured for display and be configured to dispose structures such as circuits. The first sub-region A1 may located in the display region AA, and the second sub-region A2 may be located in the non-display region NA. Optionally, the first sub-region A1 may be overlapped with the display region AA.

When the substrate module 100 is used in the display apparatus, the display region AA may include a plurality of sub-pixels P, and the first loads 30 may include the sub-pixels P. That is, the first sub-pins 21 in the substrate module 100 may be electrically connected to the sub-pixels P in the display region AA, and the second loads 40 may be disposed in the non-display region NA.

In the display apparatus, the first sub-pin 21 in the first substrate 10 may be electrically connected to the sub-pixel P. When the number of pins in the drive chip is greater than the number of the first sub-pins 21 in the first substrate 10, the pins in the drive chip that are not electrically connected to the first sub-pins 21 may be extra pins. Extra pins in the drive chip may have the function of outputting signals and may be electrically connected to the second sub-pins 22. By disposing the second loads 50 in the second sub-region A2 and electrically connecting the second sub-pins 22 to the second loads 50, extra pins in the drive chip may be electrically connected to the second loads 50, which may avoid that some pins in the drive chip may be in a floating state and effectively improve the working performance of the drive chip.

Meanwhile, the pins in the drive chip that are not electrically connected to the first sub-pin 21 may be electrically connected to the second sub-pins 22, that is, pins in the drive chip that are not electrically connected to the first sub-pin 21 may be electrically connected to the second loads 50. Therefore, the number of pins in the drive chip may not need to be same as the number of the first sub-pins 21 in the first substrate 10. In such way, it may avoid that one drive chip can only be applied to a display apparatus with a specific number of first sub-pins 21, which may effectively expand the scope of application of the drive chip; and there is no need to provide different drive chips for display apparatuses with different numbers of the first sub-pins 21, which may effectively reduce the fabrication cost.

It should be noted that, optionally, in the COG process, the pins in the drive chip may be directly electrically connected to the first pins 20 in the substrate module. Optionally, in the COF process, the pins in the drive chip may be electrically connected to the pins in the flexible circuit board, and the pins in the flexible circuit board may be electrically connected to the first pins 20 in the substrate module, thereby realizing that the pins in the drive chip may be electrically connected to the first pins in the substrate module.

Figure 21:
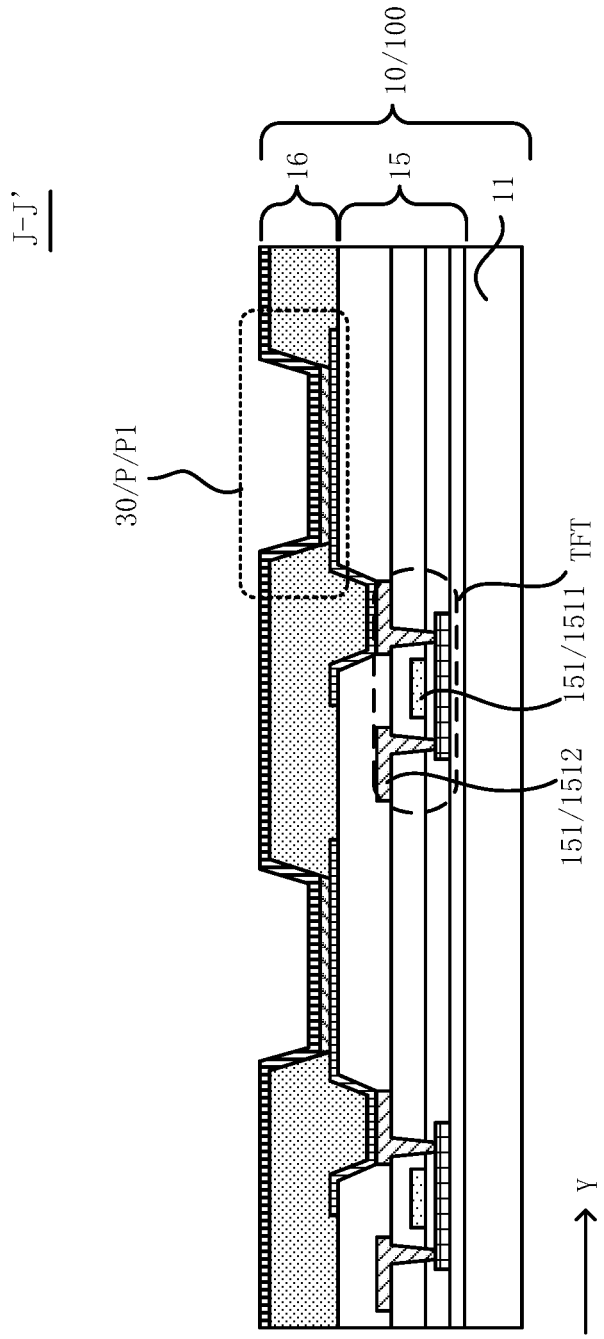
FIG. 21 illustrates a cross-sectional view of a display apparatus along a J-J' direction in FIG. 20.

FIG. 21 illustrates a cross-sectional view of the display apparatus along a J-J' direction in FIG. 20. Referring to FIGS. 20-21 and also referring to FIGS. 2-3 for the structure of the second load, in some optional embodiments, the display apparatus provided in one embodiment may be an organic light-emitting display apparatus. In the organic light-emitting display apparatus, a circuit layer 15 and a light-emitting layer 16 may be sequentially disposed on a side of the first base substrate 11, the light-emitting layer 16 may include a plurality of light-emitting elements P1, the circuit layer 15 may include a plurality of metal layers 151, the transistor TFT may be formed by the plurality of metal layers 151 in the circuit layer 15, and the transistor TFT may be electrically connected to the light-emitting element P1.

A metal layer 151 may be reused as the first electrode layer 12; and another metal layer 151 may be reused as the second electrode layer 14. Different metal layers 151 that are insulated from each other may be reused as the first electrode layer 12 and the second electrode layer 14. Exemplarily, the first metal layer 1511 may be reused as the first electrode layer 12; the second metal layer 1512 may be reused as the second electrode layer 14; and the second metal layer 1512 may be located on a side of the first metal layer 1511 away from the first base substrate 11. Obviously, in other embodiments of the present disclosure, other metal layers 151 may be reused as the first electrode layer 12 and the second electrode layer 14, which may not be described in detail in the present disclosure.

In the display apparatus, by reusing the plurality of metal layers 151 in the circuit layer 15 as the first electrode layer 12 and the second electrode layer 14, the process of the display apparatus may be effectively simplified, and the production cost may be reduced, which may be beneficial for reducing the thickness of the display apparatus.

Figure 22:
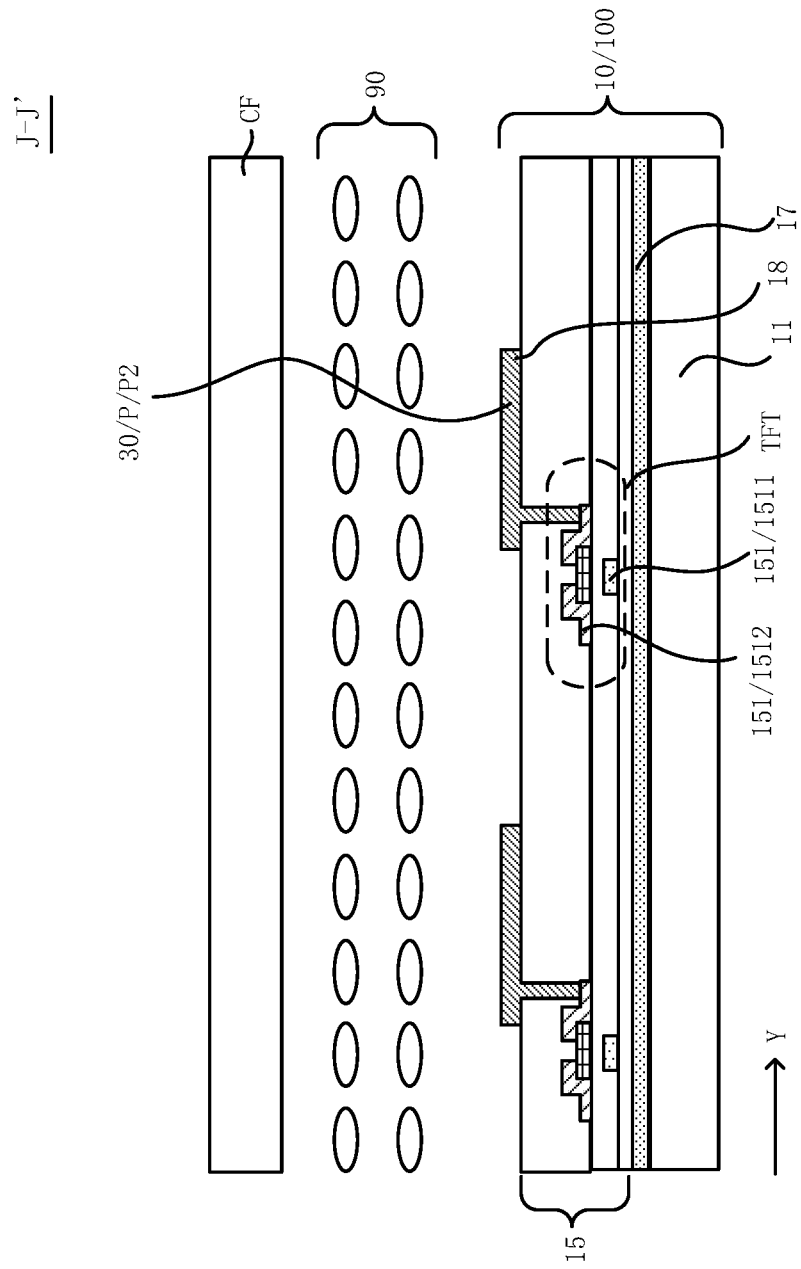
FIG. 22 illustrates another cross-sectional view of a display apparatus along a J-J' direction in FIG. 20.

FIG. 22 illustrates another cross-sectional view of the display apparatus along a J-J' direction in FIG. 20. Referring to FIGS. 20-22 and referring to FIGS. 2-3 for the structure of the second load, in some optional embodiments, the display apparatus provided in one embodiment may be a liquid crystal display apparatus. The liquid crystal display apparatus may include the first substrate 10 and a color filter substrate CF which are disposed opposite to each other, and include a liquid crystal layer 90 located between the first substrate 10 and the color filter substrate CF. The first substrate 10 may be an array substrate. A common electrode layer 17, a circuit layer 15 and a pixel electrode layer 18 may be disposed sequentially on a side of the first base substrate 11. The pixel electrode layer 18 may include a plurality of pixel electrodes P2, and the circuit layer 15 may include a plurality of metal layers 151. The transistor TFT may be formed through the plurality of metal layers 151 in the circuit layer 15, and the transistor TFT may be electrically connected to the pixel electrode P2.

The common electrode layer 17 or the metal layer 151 may be reused as the first electrode layer 12; and the metal layer 151 or the pixel electrode layer 18 may be reused as the second electrode layer 14. Exemplarily, the common electrode layer 17 may be reused as the first electrode layer 12; and the first metal layer 1511 may be reused as the second electrode layer 14. Obviously, in other embodiments of the present disclosure, other film layers may be reused as the first electrode layer 12 and the second electrode layer 14, which may not be described in detail in the present disclosure.

In the display apparatus, the common electrode layer 17 or the metal layer 151 may be reused as the first electrode layer 12, and the metal layer 151 or the pixel electrode layer 18 may be reused as the second electrode layer 14, which may effectively simplify the process of the display apparatus, reduce the production cost, and be beneficial for reducing the thickness of the display apparatus.

In some optional embodiments, the structure of the second load refers to FIGS. 2-3. The material of the first electrode layer 12 may be at least one of molybdenum, aluminum, titanium-aluminum stack, molybdenum-aluminum stack, indium tin oxide, copper, and/or any suitable materials; and the material of the second electrode layer 14 may be at least one of molybdenum, aluminum, titanium-aluminum stack, molybdenum-aluminum stack, indium tin oxide, copper, and/or any suitable materials.

Molybdenum, aluminum, titanium-aluminum stack, molybdenum-aluminum stack, indium tin oxide, and copper may all be commonly used materials in display apparatuses. The first electrode layer 12 and the second electrode layer 14 may be made by at least one of molybdenum, aluminum, titanium-aluminum stack, molybdenum-aluminum stack, indium tin oxide, and copper, which may effectively reduce the fabrication cost of the first electrode layer 12 and the second electrode layer 14.

It should be noted that in one embodiment, it exemplarily shows that the material of the first electrode layer 12 may be at least one of molybdenum, aluminum, titanium-aluminum stack, molybdenum-aluminum stack, indium tin oxide, copper, and/or any suitable materials; and the material of the second electrode layer 14 may be at least one of molybdenum, aluminum, titanium-aluminum stack, molybdenum-aluminum stack, indium tin oxide, copper and/or any suitable materials. In other embodiments of the present disclosure, the first electrode layer 12 and the second electrode layer 14 may also be made of other materials according to actual fabrication needs, which may not be described in detail herein.

Figure 23:
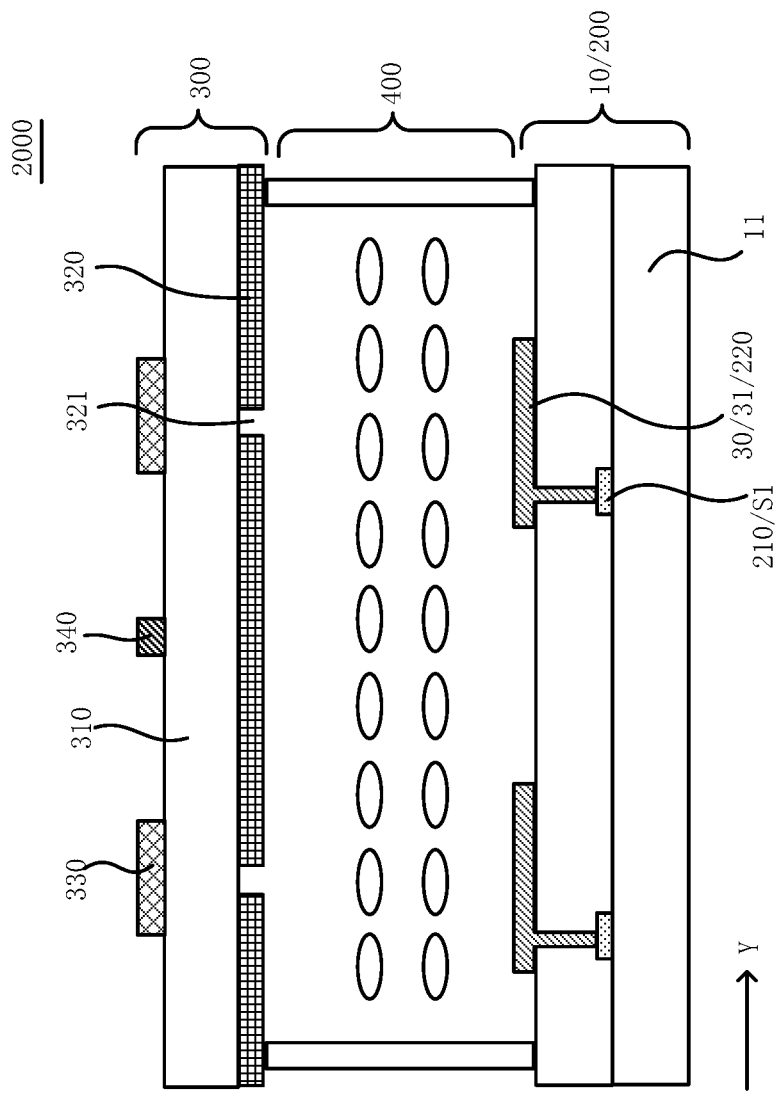
FIG. 23 illustrates a structural schematic of a liquid crystal antenna according to various embodiments of the present disclosure.

In some optional embodiments, referring to FIG. 23, FIG. 23 illustrates a structural schematic of a liquid crystal antenna according to various embodiments of the present disclosure. A liquid crystal antenna 2000 provided in one embodiment may include the substrate module 200 provided in above-mentioned embodiments of the present disclosure. The liquid crystal antenna 2000 provided by embodiments of the present disclosure may have the beneficial effects of the substrate module 200 provided by embodiments of the present disclosure. Details refer to specific description of the substrate module 200 in above-mentioned embodiments, which may not be described in detail in one embodiment.

Figure 24:
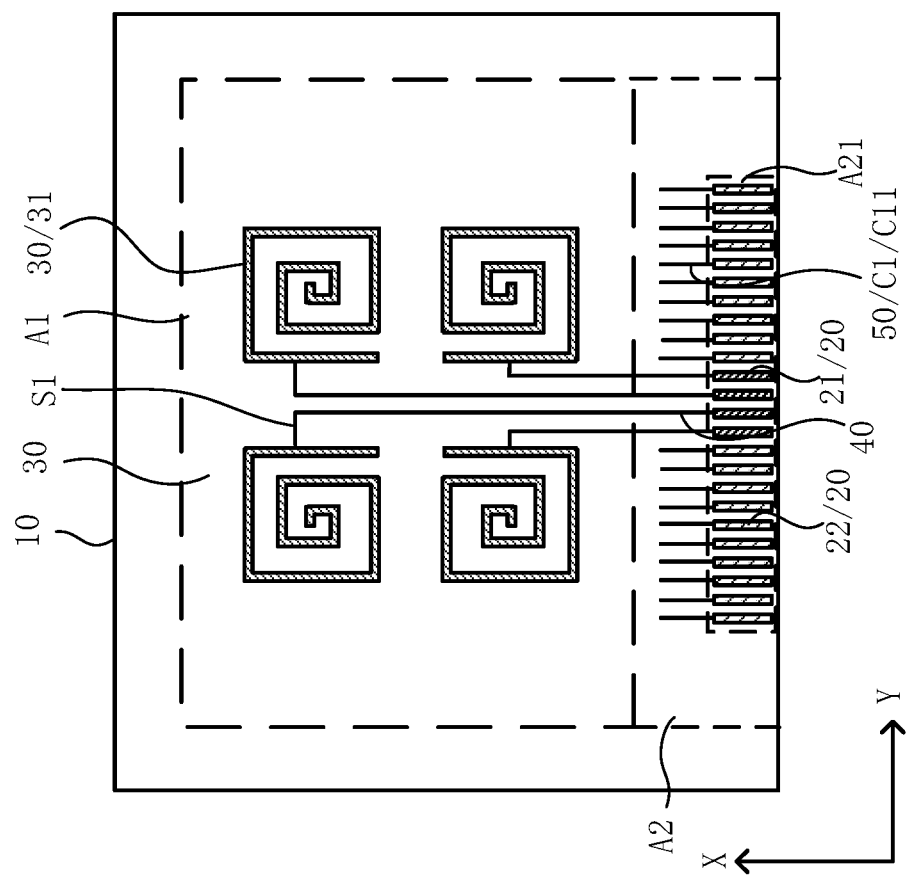
FIG. 24 illustrates a planar schematic of a first substrate in a liquid crystal antenna in FIG. 23.

FIG. 24 illustrates a planar schematic of the first substrate in the liquid crystal antenna in FIG. 23. Referring to FIGS. 23-24, in some optional embodiments, the liquid crystal antenna may include the first substrate 10 and the second substrate 300 which are disposed opposite to each other and include a liquid crystal layer 400 located between the first substrate 10 and the second substrate 300.

The first substrate 10 may include a plurality of transmission electrodes 31; and the transmission electrode 31 may be located on the side of the first base substrate 11 adjacent to the second substrate 300. The transmission electrode 31, located in the first sub-region A1, may be the first load 30.

Exemplarily, in embodiments of the present disclosure, the transmission electrode 31 may be a planar transmission line. The planar transmission line may be a microstrip line. The shape of the transmission electrode 31 may not be limited in embodiments of the present disclosure, as long as the configuration of the transmission electrode 31 may realize microwave signal transmission. For example, the shape of the transmission electrode 31 may also be designed as a spiral shape as shown in FIG. 24. Obviously, in other embodiments of the present disclosure, the transmission electrode 31 may also use other shapes, such as a serpentine line, a folded line, a straight arc, and/or the like, which may not be described in detail in the present disclosure.

In the liquid crystal antenna, the first sub-pin 21 in the first substrate 10 may be electrically connected to the transmission electrode 31.

Optionally, the drive chip in the liquid crystal antenna may be a drive chip in a conventional display apparatus. At least a part of the pins on the drive chip in the conventional display apparatus may be configured for electrical connection with the sub-pixels in the conventional display apparatus. Since the number of transmission electrodes 31 in the liquid crystal antenna is much less than the number of sub-pixels in the conventional display apparatus, when the drive chip in the liquid crystal antenna uses the drive chip in the conventional display apparatus, some pins in the drive chip may not be electrically connected to the transmission electrode 31, and these pins may be in a floating state.

When the number of pins in the drive chip is greater than the number of the first sub-pins 21 in the first substrate 10, the pins in the drive chip that are not electrically connected to the first sub-pins 21 are extra pins. The extra pins in the drive chip may have the function of outputting signals. The extra pins in the drive chip may be electrically connected to the second sub-pins 22. By disposing the second loads 50 in the second sub-region A2 and electrically connecting the second sub-pins 22 to the second loads 50, the extra pins in the drive chip may be electrically connected to the second loads 50, thereby avoiding some pins in the drive chip being in a floating state and effectively improving the performance of the drive chip.

Meanwhile, the pins in the drive chip that are not electrically connected to the first sub-pins 21 may be electrically connected to the second sub-pins 22, that is, the pins in the drive chip that are not electrically connected to the first sub-pins 21 may be electrically connected to the second loads 50. Therefore, the number of pins in the drive chip may not need to be same as the number of the first sub-pins 21 in the first substrate 10. In such way, it may avoid that one drive chip can only be applied to the liquid crystal antenna with a specific number of first sub-pins 21, which may effectively expand the scope of application of the drive chip; and there is no need to set different drive chips for the liquid crystal antennas with different numbers of the first sub-pins 21, which may effectively reduce the fabrication cost.

It should be noted that, optionally, in the COG process, the pins in the drive chip may be directly electrically connected to the first pins 20 in the substrate module. Optionally, in the COF process, the pins in the drive chip may be electrically connected to the pins in the flexible circuit board, and the pins in the flexible circuit board may be electrically connected to the first pins 20 in the substrate module, such that the pins in the drive chip may be electrically connected to the first pins in the substrate module.

Referring to FIGS. 23-24 and also referring FIGS. 2-3 for the structure of the second load, in some optional embodiments, a wiring layer 210 and a transmission electrode layer 220 may be sequentially disposed on the side of the first base substrate 11 adjacent to the second substrate 300. The wiring layer 210 may include a plurality of first wirings 51; the transmission electrode layer 220 may include a plurality of transmission electrodes 31; and the transmission electrodes 31 and the first sub-pins 21 may be electrically connected through the first wirings 51.

The wiring layer 210 may be reused as the first electrode layer 12, and the transmission electrode layer 220 may be reused as the second electrode layer 14. The wiring layer 210 may be reused as the first electrode layer 12, and the transmission electrode layer 220 may be reused as the second electrode layer 14, which may effectively simplify the process of the liquid crystal antenna, reduce the production cost, and be beneficial for reducing the thickness of the liquid crystal antenna.

In some optional embodiments, the structure of the second load refers to FIGS. 2-3. The material of the first electrode layer 12 may be indium tin oxide or copper, and the material of the second electrode layer 14 may be indium tin oxide or copper.

Both indium tin oxide and copper are commonly used materials in liquid crystal antennas. The first electrode layer 12 and the second electrode layer 14 may be fabricated by indium tin oxide or copper, which may effectively reduce the fabrication cost of the first electrode layer 12 and the second electrode layer 14.

It should be noted that in one embodiment, it exemplarily describes that the material of the first electrode layer 12 may be indium tin oxide or copper, and the material of the second electrode layer 14 may be indium tin oxide or copper. In other embodiments of the present disclosure, the first electrode layer 12 and the second electrode layer 14 may also be made of other materials according to actual fabrication needs, which may not be described in detail herein.

Referring to FIGS. 23-24, in some optional embodiments, the second substrate 300 may include a second base substrate 310, a ground electrode 320, a radiator 330 and a feeder 340. The ground electrode 320 may be located on the side of the second base substrate 310 adjacent to the first substrate 10; and the radiator 330 and the feeder 340 may be located on the side of the second base substrate 310 away from the first substrate 10.

The feeder 340 may be configured to receive microwave signals, and the radiator 330 may be configured to radiate phase-shifted microwave signals. During microwave signal transmission, under the action of the voltage difference between the transmission electrode 31 and the ground electrode 320, the liquid crystal molecules in the liquid crystal layer 400 may be deflected to change the phase of the microwave signal, thereby realizing the phase shift function of the microwave signal. In embodiments of the present disclosure, the voltage difference between the transmission electrode 31 and the ground electrode 320 may be controlled by controlling the bias driving voltage on the transmission electrode 31.

It should be noted that FIG. 23 exemplarily illustrates that the transmission electrode 31 and the ground electrode 320 are respectively disposed on the first substrate 10 and the second substrate 300. In an actual liquid crystal antenna, the transmission electrode 31 and the ground electrode 320 may also be configured according to other positional relationships. For example, the transmission electrode 31 and the ground electrode 320 may also be configured on a same substrate, which may not be described in the present disclosure.

Figure 25:
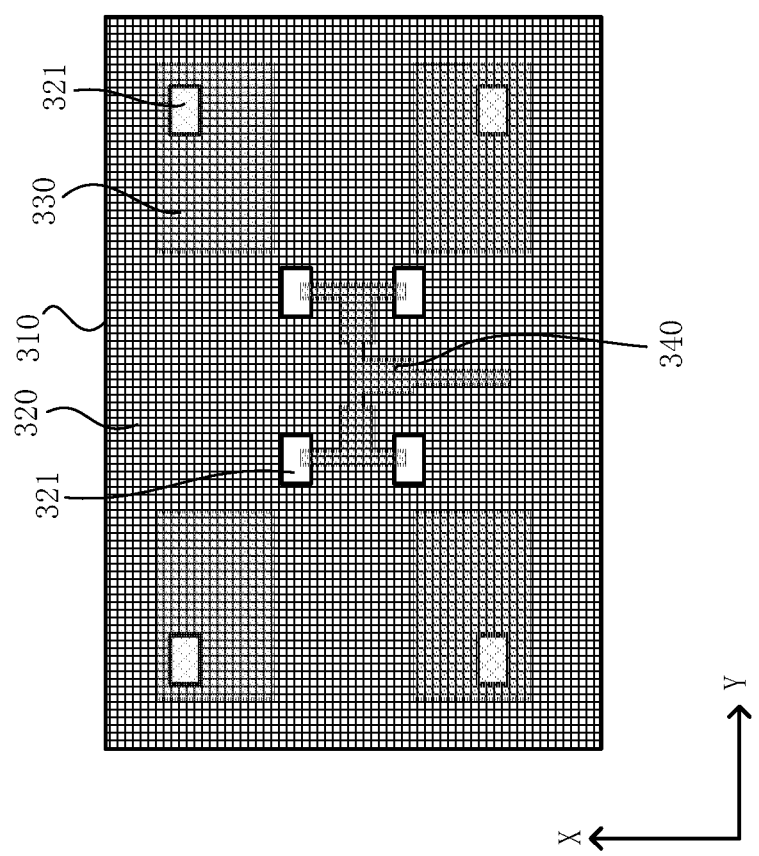
FIG. 25 illustrates a planar schematic of a second substrate in a liquid crystal antenna in FIG. 23.

FIG. 25 illustrates a planar schematic of a second substrate in the liquid crystal antenna in FIG. 23. Referring to FIGS. 23 and 25, the orthographic projection of a part of an opening 321 in the ground electrode 320 on the plane where the second base substrate 310 is located may be at least partially overlapped with the orthographic projection of the feeder 340 on the plane where the second base substrate 310 is located. Therefore, the microwave signal on the second base substrate 310 may be transmitted to the side of the second substrate 300 away from the feeder 340 through such part of the opening 321. The orthographic projection of another part of the opening 321 in the ground electrode 320 on the plane where the second base substrate 310 is located may be at least partially overlapped with the orthographic projection of the radiator 330 on the plane where the second base substrate 310 is located. Through such arrangement, the phase-shifted microwave signal may be transmitted to the radiator 330 through such part of the opening 321 and radiated out through the radiator 330.

Optionally, in embodiments of the present disclosure, an end of the feeder 340 may be connected to a radio frequency connector (not shown in FIGS. 23 and 25). The RF connector may be used as the signal source to provide the microwave signal.

In embodiments of the present disclosure, the shape of the radiator 330 may be formed as a rectangle or a circle. The shape of the radiator 330 may be configured as a rectangle for illustration in FIG. 25.

From above-mentioned embodiments, it may be seen that the substrate module, the display apparatus and the liquid crystal antenna provided by the present disclosure may achieve at least following beneficial effects.

In the substrate module provided by the present disclosure, the substrate module may include the first substrate; the first substrate may include the first sub-region and the second sub-region; the second sub-region may be on the side of the first sub-region along the first direction and include the binding region; the binding region may include the plurality of first pins arranged along the second direction; and the first pins may be configured for electrical connection with the pins in the drive chip. In the COG process, the pins in the drive chip may be directly electrically connected to the first pins in the substrate module. In the COF process, the pins in the drive chip may be electrically connected to the pins in the flexible circuit board, and the pins in the flexible circuit board may be electrically connected to the first pins in the substrate module, such that the pins in the drive chip may be electrically connected to the first pins in the substrate module. The plurality of first pins in the first substrate may include at least one second sub-pin. The second sub-region may include at least one second load, and the second sub-pin may be electrically connected to the second load. When the number of pins in the drive chip is greater than the number of the first sub-pins in the first substrate, the pins in the drive chip that are not electrically connected to the first sub-pins are extra pins. The extra pins in the drive chip may have the function of outputting signals. The extra pins in the drive chip may be electrically connected to the second sub-pins. By disposing the second loads in the second sub-region and electrically connecting the second sub-pins to the second loads, the extra pins in the drive chip may be electrically connected to the second loads, thereby avoiding some pins in the drive chip being in a floating state and effectively improving the performance of the drive chip. Meanwhile, the pins in the drive chip that are not electrically connected to the first sub-pins may be electrically connected to the second sub-pins, that is, the pins in the drive chip that are not electrically connected to the first sub-pins may be electrically connected to the second loads. Therefore, the number of pins in the drive chip may not need to be same as the number of the first sub-pins in the first substrate. It may avoid that one drive chip can only be applied to the first substrate with a specific number of first sub-pins, which may effectively expand the scope of application of the drive chip; and there is no need to set different drive chips for the first substrates with different numbers of the first sub-pins, which may effectively reduce the fabrication cost.

Although some embodiments of the present disclosure have been described in detail through examples, those skilled in the art should understand that above-mentioned examples are provided for illustration only and not for the purpose of limiting the scope of the disclosure. Those skilled in the art should understand that modifications may be made to above-mentioned embodiments without departing from the scope and spirit of the present disclosure. The scope of the present disclosure may be defined by appended claims.

What is claimed is:

1. A substrate module, comprising:
a first substrate, wherein the first substrate includes a first sub-region and a second sub-region; the second sub-region is on a side of the first sub-region along a first direction; the second sub-region includes a binding region; the binding region includes a plurality of first pins arranged along a second direction; and the first direction intersects the second direction, wherein:
the plurality of first pins includes at least one first sub-pin and at least one second sub-pin;
the first sub-region includes a plurality of first loads, and a first sub-pin is electrically connected to a first load of the plurality of first loads;
the second sub-region includes at least one second load, and a second sub-pin is electrically connected to a second load;
the second load includes a capacitor including a first capacitor;
the first substrate includes a first base substrate, and further includes a first electrode layer, a first insulating layer and a second electrode layer which are sequentially arranged on a side of the first base substrate;
the first electrode layer includes a first electrode portion; the second electrode layer includes a second electrode portion; and the second electrode portion is electrically connected to the second sub-pin;
along a direction perpendicular to a plane of the base substrate, the first electrode portion is at least partially overlapped with the second electrode portion; and an overlapping portion of the first electrode portion and the second electrode portion forms the first capacitor;
a first pin of the plurality of first pins includes a first sub-portion and a second sub-portion which are electrically connected with each other; the first sub-portion is in the second electrode layer; and the second sub-portion is in the first electrode layer;
the plurality of first pins further includes at least one third sub-pin, and the first electrode portion is electrically connected to a third sub-pin;
each of a second sub-portion of the first sub-pin and a second sub-portion of the second sub-pin is insulated from the first electrode portion in the first electrode layer; and
a second sub-portion of the third sub-pin is electrically connected to the first electrode portion.

2. The substrate module according to claim 1, wherein:
the first capacitor is between the first sub-region and the binding region.

3. The substrate module according to claim 1, wherein:
the capacitor further includes a second capacitor;
the first electrode layer further includes a third electrode portion, wherein the third electrode portion is in the binding region and on a side of the second sub-portion away from the first electrode portion;
each of the second sub-portion of the first sub-pin and the second sub-portion of the second sub-pin is insulated from the third electrode portion; and
along the direction perpendicular to the plane of the base substrate, a first sub-portion of the second sub-pin is at least partially overlapped with the third electrode portion, and an overlapping portion of the first sub-portion of the second sub-pin and the third electrode portion forms the second capacitor.

4. The substrate module according to claim 3, wherein:
the third electrode portion is electrically connected to the third sub-pin.

5. The substrate module according to claim 3, wherein:
along the direction perpendicular to the plane of the base substrate, a first sub-portion of the first sub-pin is not overlapped with the third electrode portion.

6. The substrate module according to claim 1, wherein:
the second load further includes a resistor;
the second electrode layer further includes a first wiring, wherein the second electrode portion is electrically connected to the second sub-pin through the first wiring; and
the first wiring forms the resistor.

7. The substrate module according to claim 6, wherein:
the first wiring is a serpentine wiring structure.

8. The substrate module according to claim 1, wherein:
along the second direction, the first sub-pin is not disposed between at least two adjacent second sub-pins.

9. The substrate module according to claim 1, further including:
a chip on film including a flexible circuit board and a drive chip fixed on the flexible circuit board, wherein:
the flexible circuit board includes a plurality of second pins, wherein the plurality of second pins includes at least one fourth sub-pin and at least one fifth sub-pin;
one fourth sub-pin is electrically connected to one first sub-pin; and
one fifth sub-pin is electrically connected to one second sub-pin.

10. A display apparatus, comprising:
a substrate module, comprising:
a first substrate, wherein the first substrate includes a first sub-region and a second sub-region; the second sub-region is on a side of the first sub-region along a first direction; the second sub-region includes a binding region; the binding region includes a plurality of first pins arranged along a second direction; and the first direction intersects the second direction, wherein:
- the plurality of first pins includes at least one first sub-pin and at least one second sub-pin;
- the first sub-region includes a plurality of first loads, and a first sub-pin is electrically connected to a first load of the plurality of first loads;
- the second sub-region includes at least one second load, and a second sub-pin is electrically connected to a second load;
- the second load includes a capacitor including a first capacitor;
- the first substrate includes a first base substrate, and further includes a first electrode layer, a first insulating layer and a second electrode layer which are sequentially arranged on a side of the first base substrate;
- the first electrode layer includes a first electrode portion; the second electrode layer includes a second electrode portion; and the second electrode portion is electrically connected to the second sub-pin;
- along a direction perpendicular to a plane of the base substrate, the first electrode portion is at least partially overlapped with the second electrode portion; and an overlapping portion of the first electrode portion and the second electrode portion forms the first capacitor;
- a first pin of the plurality of first pins includes a first sub-portion and a second sub-portion which are electrically connected with each other; the first sub-portion is in the second electrode layer; and the second sub-portion is in the first electrode layer;
- the plurality of first pins further includes at least one third sub-pin, and the first electrode portion is electrically connected to a third sub-pin;
- each of a second sub-portion of the first sub-pin and a second sub-portion of the second sub-pin is insulated from the first electrode portion in the first electrode layer; and
- a second sub-portion of the third sub-pin is electrically connected to the first electrode portion.

11. The display apparatus according to claim 10, wherein:
the display apparatus includes a display region and a non-display region surrounding the display region; the first sub-region is at the display region, and the second sub-region is at the non-display region; and
the display region includes a plurality of sub-pixels; and a sub-pixel of the plurality of sub-pixels is the first load.

12. The display apparatus according to claim 10, wherein:
a circuit layer and a light-emitting layer are sequentially disposed on the side of the first base substrate; and the circuit layer includes a plurality of metal layers;
one metal layer of the plurality of metal layers is reused as the first electrode layer; and
another metal layer of the plurality of metal layers is reused as the second electrode layer.

13. The display apparatus according to claim 10, wherein:
a common electrode layer, a circuit layer and a pixel electrode layer are sequentially disposed sequentially on the side of the first base substrate; and the circuit layer includes a plurality of metal layers;
the common electrode layer or one metal layer of the plurality of metal layers is reused as the first electrode layer; and
another metal layer of the plurality of metal layers or the pixel electrode layer is reused as the second electrode layer.

14. The display apparatus according to claim 10, wherein:
the first electrode layer is made of a material including at least one of molybdenum, aluminum, titanium-aluminum stack, molybdenum-aluminum stack, indium tin oxide, and copper; and
the second electrode layer is made of a material including at least one of molybdenum, aluminum, titanium-aluminum stack, molybdenum-aluminum stack, indium tin oxide, and copper.

15. A liquid crystal antenna, comprising:
a substrate module, comprising:
- a first substrate, wherein the first substrate includes a first sub-region and a second sub-region; the second sub-region is on a side of the first sub-region along a first direction; the second sub-region includes a binding region; the binding region includes a plurality of first pins arranged along a second direction; and the first direction intersects the second direction, wherein:
  - the plurality of first pins includes at least one first sub-pin and at least one second sub-pin;
  - the first sub-region includes a plurality of first loads, and a first sub-pin is electrically connected to a first load of the plurality of first loads;
  - the second sub-region includes at least one second load, and a second sub-pin is electrically connected to a second load;
  - the second load includes a capacitor including a first capacitor;
  - the first substrate includes a first base substrate, and further includes a first electrode layer, a first insulating layer and a second electrode layer which are sequentially arranged on a side of the first base substrate;
  - the first electrode layer includes a first electrode portion; the second electrode layer includes a second electrode portion; and the second electrode portion is electrically connected to the second sub-pin;
  - along a direction perpendicular to a plane of the base substrate, the first electrode portion is at least partially overlapped with the second electrode portion; and an overlapping portion of the first electrode portion and the second electrode portion forms the first capacitor;
  - a first pin of the plurality of first pins includes a first sub-portion and a second sub-portion which are electrically connected with each other; the first sub-portion is in the second electrode layer; and the second sub-portion is in the first electrode layer;
  - the plurality of first pins further includes at least one third sub-pin, and the first electrode portion is electrically connected to a third sub-pin;
  - each of a second sub-portion of the first sub-pin and a second sub-portion of the second sub-pin is insulated from the first electrode portion in the first electrode layer; and
  - a second sub-portion of the third sub-pin is electrically connected to the first electrode portion.

16. The liquid crystal antenna according to claim 15, wherein:
the liquid crystal antenna includes the first substrate and a second substrate which are oppositely disposed, and includes a liquid crystal layer between the first substrate and the second substrate; and the first substrate includes a plurality of transmission electrodes; and a transmission electrode of the plurality of transmission electrodes is on a side of the first base substrate adjacent to the second substrate; and the transmission electrode, which is in the first sub-region, is the first load.

17. The liquid crystal antenna according to claim 16, wherein:
   a wiring layer and a transmission electrode layer are sequentially disposed on a side of the first base substrate adjacent to the second substrate;
   the wiring layer is reused as the first electrode layer; and the transmission electrode layer is reused as the second electrode layer; and/or
   the first electrode layer is made of indium tin oxide or copper, and the second electrode layer is made of indium tin oxide or copper.

18. The liquid crystal antenna according to claim 15, wherein:
   the second substrate includes a second base substrate, a ground electrode, a radiator and a feeder, wherein the ground electrode is on a side of the second base substrate adjacent to the first substrate; and the radiator and the feeder are on a side of the second base substrate away from the first substrate.

* * * * *